July 24, 1951    D. C. CULVER    2,561,612
CATHODE-RAY TUBE APPARATUS FOR COMPARING
TWO ELECTRICAL SIGNALS
Filed May 10, 1945    5 Sheets-Sheet 1

*INVENTOR.*
DONALD C. CULVER

BY
*ATTORNEY.*

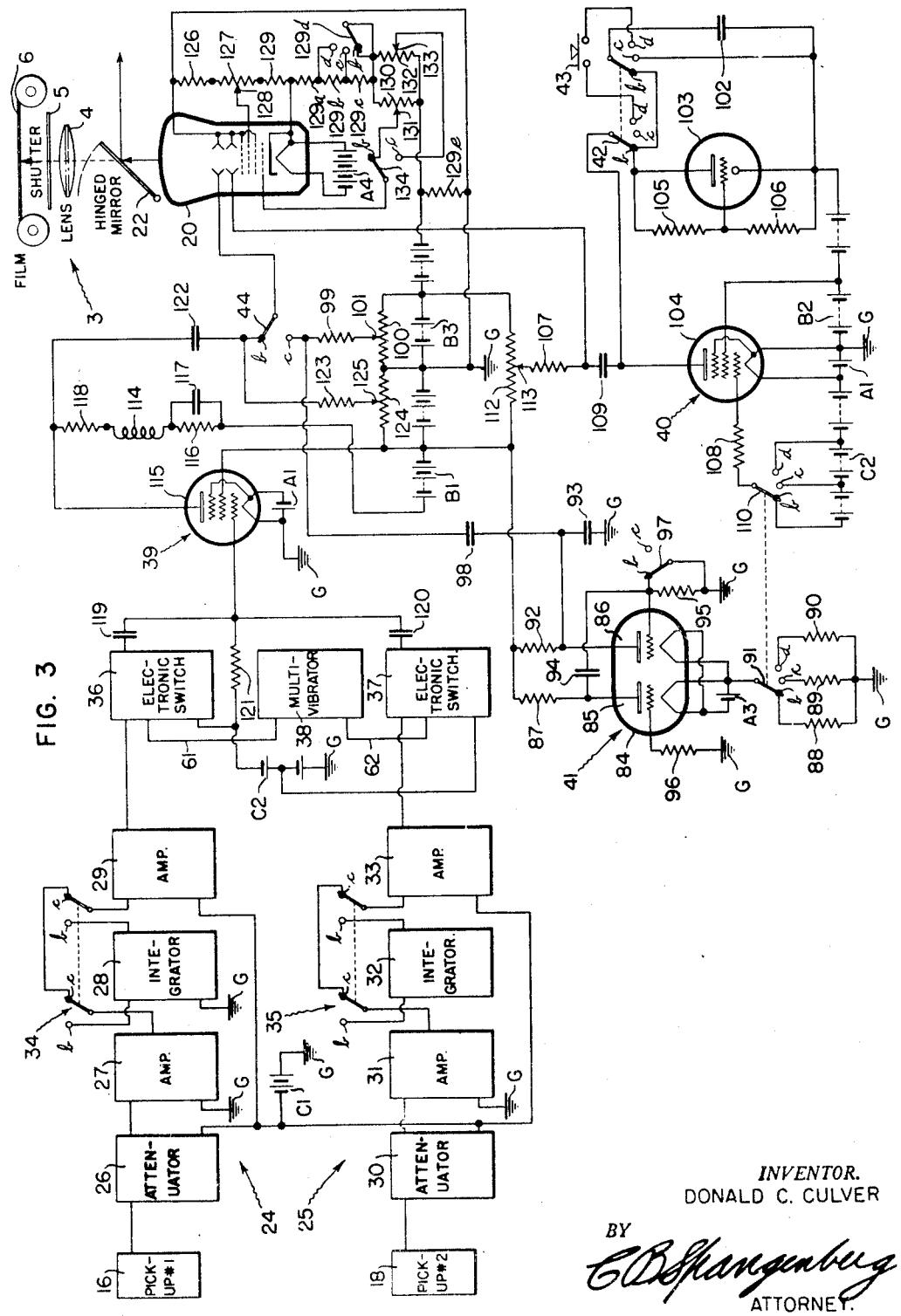

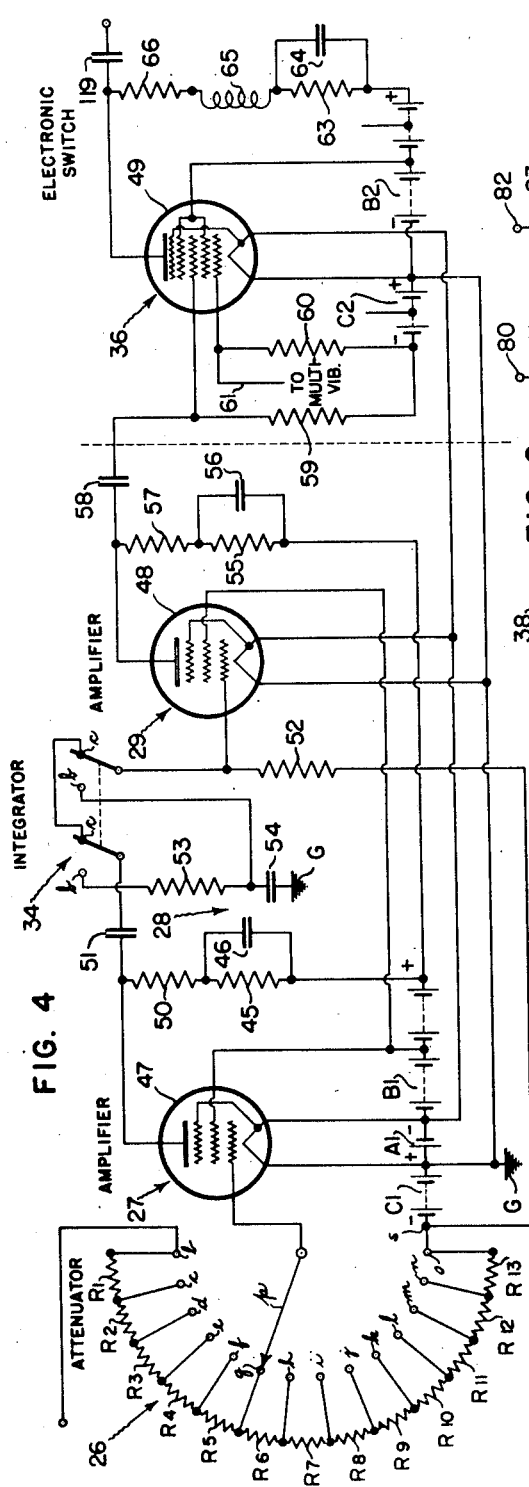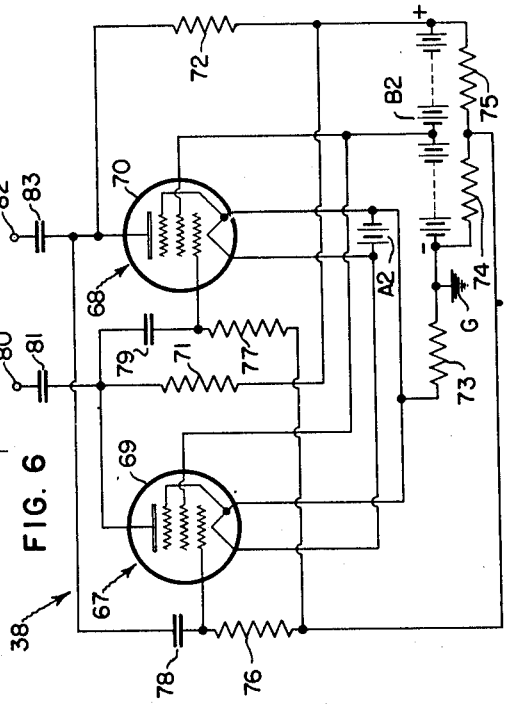

July 24, 1951 D. C. CULVER 2,561,612
CATHODE-RAY TUBE APPARATUS FOR COMPARING
TWO ELECTRICAL SIGNALS
Filed May 10, 1945 5 Sheets-Sheet 4
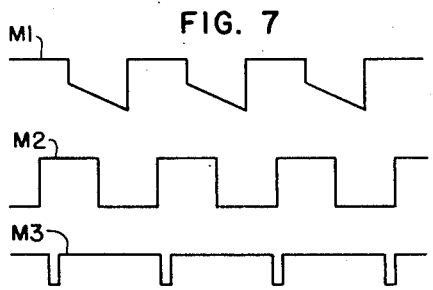
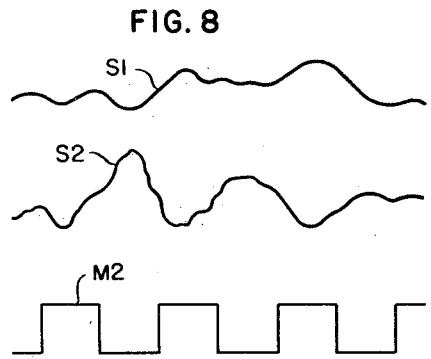
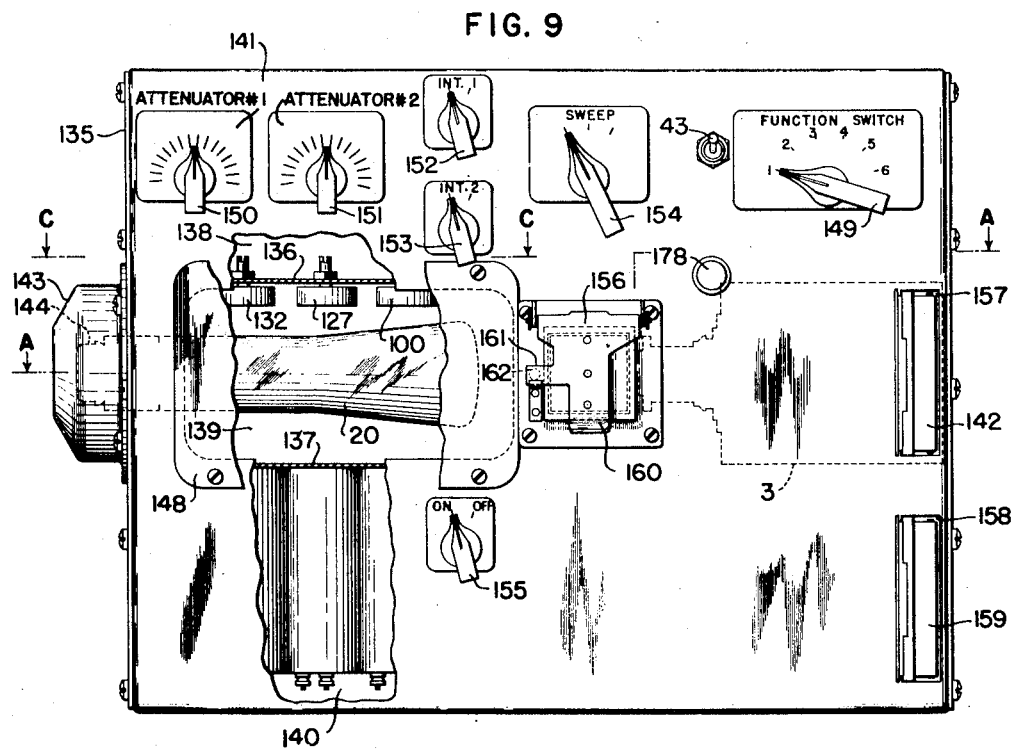
*INVENTOR.*
DONALD C. CULVER
BY
ATTORNEY.

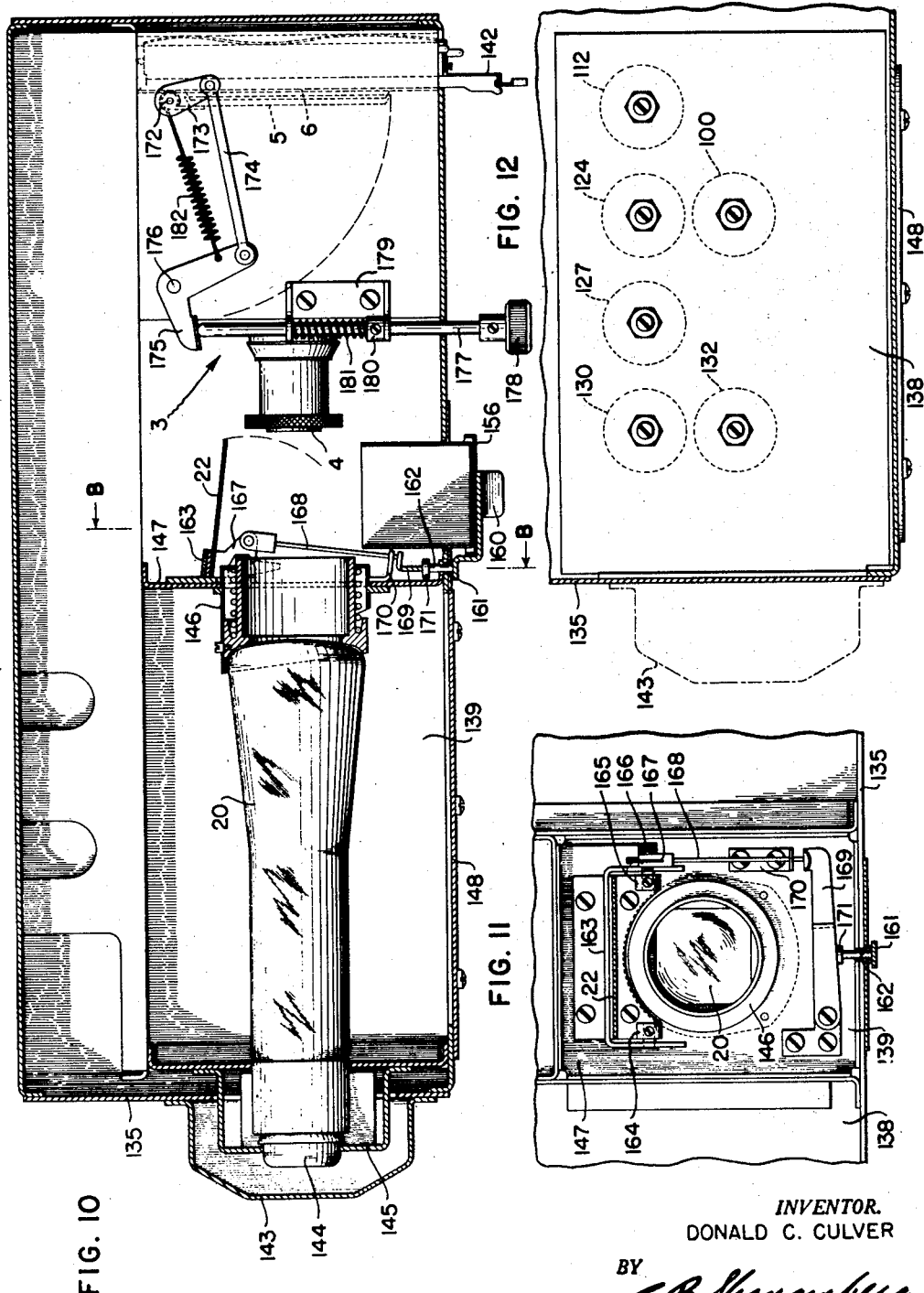

Patented July 24, 1951

2,561,612

UNITED STATES PATENT OFFICE 2,561,612

CATHODE-RAY TUBE APPARATUS FOR COMPARING TWO ELECTRICAL SIGNALS

Donald C. Culver, South Ardmore, Pa., assignor, by mesne assignments, to Minneapolis-Honeywell Regulator Company, Minneapolis, Minn., a corporation of Delaware Application May 10, 1945, Serial No. 593,039

6 Claims. (Cl. 171—95)

The present invention relates generally to vibration indicating and recording apparatus and has especial utility for obtaining data useful in analyzing vibration and flutter phenomena in aircraft during flight.

As the flying speeds of aircraft have increased, the need for instruments providing data useful in analyzing vibration and flutter of the aircraft structure during flight has become more urgent because of the occurrence of many fatal and apparently unexplainable accidents in the air. Airplanes in flight have been seen disintegrating, apparently exploding. Investigation, however, has revealed that they did not explode and has indicated further that disintegration occurred as a result of extremely violent vibration or shaking of the aircraft structure.

Such vibration and shaking, termed "flutter," appears at certain critical speeds and is so sudden that wings and tail surfaces are broken off before the pilot can change the speed. The violent flutter is believed to occur when the pulsating aerodynamic and other forces acting upon the aircraft synchronize with the natural resonance of the aircraft structure. It appears that the phase relations of the vibrations at various points on the structure, as well as the frequencies and amplitudes of the vibrations, play an important part in the generation of flutter.

It has been proposed, in the prior art, to analyze the vibration or flutter characteristics or tendencies of aircraft in flight by providing a number of vibration detectors or pick-up units at various displaced points on the structure and by providing measuring apparatus for simultaneously recording the wave shapes, frequencies and amplitudes of the vibrations at such points. The prior art measuring equipment, however, has been exceedingly bulky and cumbersome and heavy, weighing from 300 to 500 pounds. This has prevented its installation and use in many light types of aircraft. Moreover, little or no information as to the phase relations of the vibrations at the displaced points on the structure was obtained. In addition a great amount of time, usually as much as ten days, was required to obtain even such meagre information.

A general object of the present invention is to provide an instrument characterized by its portability, light weight, and ability in conjunction with suitable vibration pick-up units to provide in a matter of a few hours more information regarding vibration and flutter phenomena of aircraft in flight than has heretofore been obtainable.

Another object of the invention is to provide such an instrument which is capable of being mounted and operated in any position in an aircraft cockpit, and if desired, held in the lap of the pilot or other operator. A further object is to provide such an instrument which will operate satisfactorily under the normal vibration and temperature conditions encountered in an aircraft cockpit.

It is an object of the invention also to provide an instrument of the above referred type which is capable of simultaneously making permanent records of the wave shapes, frequencies, amplitudes, and phase relations of the vibrations or flutter at a pair of displaced points on the aircraft structure and is adapted to provide such records of a large number of such pairs of displaced points in rapid succession. A more specific object is to provide such an instrument incorporating suitable means for visual observation of the peak-to-peak amplitudes of the vibrations and adjustment of the instrument until the two traces to be recorded are of amplitude suited to the recording means and are readily distinguishable from each other.

A further object of the invention is to provide a flight vibration recorder which is equally adaptable for use with velocity-type vibration pick-up units and also linear type strain gauge elements. To the attainment of this end, the instrument is provided with integrating means which may be rendered operative or inoperative by a simple manipulation so as to provide a substantially linear record of the vibration.

Still another object of the invention is to provide a flight vibration recorder operable to provide records which are substantially faithful replicas of vibration frequencies from 5 to 300 cycles per second.

In one specific embodiment of the invention, two separate and similar channels for amplification and recording are provided so that simultaneous records may be obtained for each of two externally connected vibration pick-up units. Each amplifier channel is so chosen as to be suitable for operation with velocity-type vibration pick-up units having internal impedance from 5 to 500 ohms and for strain gauge elements with internal impedance from 500 to 30,000 ohms and providing a satisfactory output signal for input voltages varying from 0.5 millivolt to 2.0 volts. Photographic means are provided for recording the output signals, the separate records being displaced on the film so as to avoid overlapping of the individual traces and being of at least one half inch peak-to-peak amplitude for the above mentioned input voltages. A high impedance step-type attenuator is provided for each amplifier channel to suitably relate the output signal amplitudes to the amplifier voltage gain in a suitably large number of ratios.

It is a specific object of the invention to provide in such an instrument means for varying the number of complete cycles per inch appearing on the record and, if desired, for limiting to a suitable value the number of cycles per inch for any frequency in the range of measurement.

It is a specific object also to provide means for readily adjusting the relative positions of the separate traces on the record.

A still further specific object of the invention is to provide a novel electronic switching arrangement for alternately impressing during mutually exclusive intervals first and second electrical signals on the beam deflection plates of a cathode ray tube having a screen and including suitable means to separate the traces of each signal produced on said screen.

It is also an object of the invention to provide a novel relaxation oscillator arrangement for generating a sweep frequency signal of adjustable frequency which signal is recurrent in one condition of adjustment of the oscillator and in another condition of adjustment thereof comprises a single cycle or pulse.

A further object of the invention is to provide means for recording on each record a standard frequency timing wave, the frequency of which may be readily identified from its wave shape and which may be employed to provide a close approximation of the frequencies of the two vibrations being recorded.

Still another object of the invention is to provide a novel circuit arrangement which is both simple and efficient for generating such a standard frequency timing wave and which incorporates suitable provisions for changing the frequency of said wave.

Another specific object of the invention is to provide simple and efficient means for making a large number of vibration records in rapid succession. To this end, simple and rapidly operable means are provided for advancing or changing the film between records.

It is another object to provide such flight vibration recording apparatus which includes conveniently placed and properly marked dials for selecting the proper time axis for the recorder, for providing voltage outputs of each amplifier channel suitably related to the amplifier voltage gain, and for obtaining the desired records.

The flight vibration recorder of the present invention is characterized in that data making possible a more complete analysis of the vibration and flutter characteristics of aircraft in flight may be obtained in a matter of a few hours. The entire instrument, moreover, including the energizing batteries and recording apparatus, is of very light weight. In a preferred and satisfactory operating embodiment of the invention, the complete instrument including its energizing batteries weighs only 27 pounds and its dimensions are 6" x 12½" x 16½", thus permitting its use in even the smallest type airplanes. This preferred construction, described in detail thereinafter and providing suitable means for making visual observation of the vibration and flutter phenomena during the flight of the aircraft, is completely self-contained and includes batteries, two electronic amplifying channels each containing a suitable integrator and an electronic switch, a cathode ray oscillograph, means for observing the traces as they appear on the oscillograph screen and a camera which photographs the record. The instrument is capable of simultaneously providing on a single cathode ray oscillograph screen and of recording on a single film traces corresponding to the vibration and flutter phenomena at two displaced points on the aircraft structure, thus facilitating comparison of the wave shapes and amplitudes of the two traces and making possible determination of the phase relation existing between the vibrations at the displaced points on the aircraft structure. The vibration and flutter phenomena at more than two points on the aircraft structure may be recorded by means of the use of a selector switch for connecting pairs of displaced points on the aircraft structure in succession to the flight vibration recorder. Provision is also made in the recorder for projecting a time reference on the screen of the cathode ray oscillograph which is included in the photographic records for facilitating determination of the vibration frequencies at the various pairs of points on the aircraft structure.

The various features of novelty which characterize this invention are pointed out with particularity in the claims annexed to and forming a part of this specification. For a better understanding of the invention, however, its advantages and specific objects obtained with its use, reference should be had to the accompanying drawing and descriptive matter in which is illustrated and described a preferred embodiment of the invention.

Of the drawings:

Fig. 3 illustrates a modification of the circuit arrangement of Fig. 2, constituting a preferred form of my invention for use in analyzing the vibration and flutter phenomena in aircraft;

Fig. 4 illustrates in detail the attenuators, amplifiers, integrators and electronic switches of the arrangement of Fig. 3;

Fig. 5 is a graph showing the manner in which the integrators of Figs. 3 and 4 operate to change the character of the signal under detection;

Fig. 6 is a schematic illustration of one form of multi-vibrator which may be employed in the arrangement of Fig. 3;

Fig. 7 is a graph illustrating representative wave shapes adapted to be produced by the marking signal generator of Fig. 3;

Fig. 8 is a graph illustrating the relation of the vibration traces and of the marking signal and is representative of the photographic patterns obtained with the preferred embodiment shown in Figs. 3–6;

Fig. 9 is an elevational view, with some parts broken away, of my preferred flight vibration recorder construction, showing the various control devices and the means for visually observing the oscillograph record and the means for making the photographic record;

Fig. 10 is a view taken along the lines A—A in Fig. 9;

Fig. 11 is a view taken along the line B—B in Fig. 10; and

Fig. 12 is a view taken along the line C—C in Fig. 9,

For the purpose of illustration, the various apparatus embodiments disclosed herein have been described as applied to permit visual observation and to obtain photographic records of the vibration and flutter of aircraft during flight. It will be understood, however, that the physical embodiments of my invention are not restricted to such use but are applicable generally wherever it is desired to inspect and make permanent records of the relative wave shapes, amplitudes, frequencies and phase relations of the vibrations at displaced points on any vibrating structure and also are adapted to provide inspection and recording of the same characteristics of two undulating voltages regardless of their manner of derivation.

Figure 1:
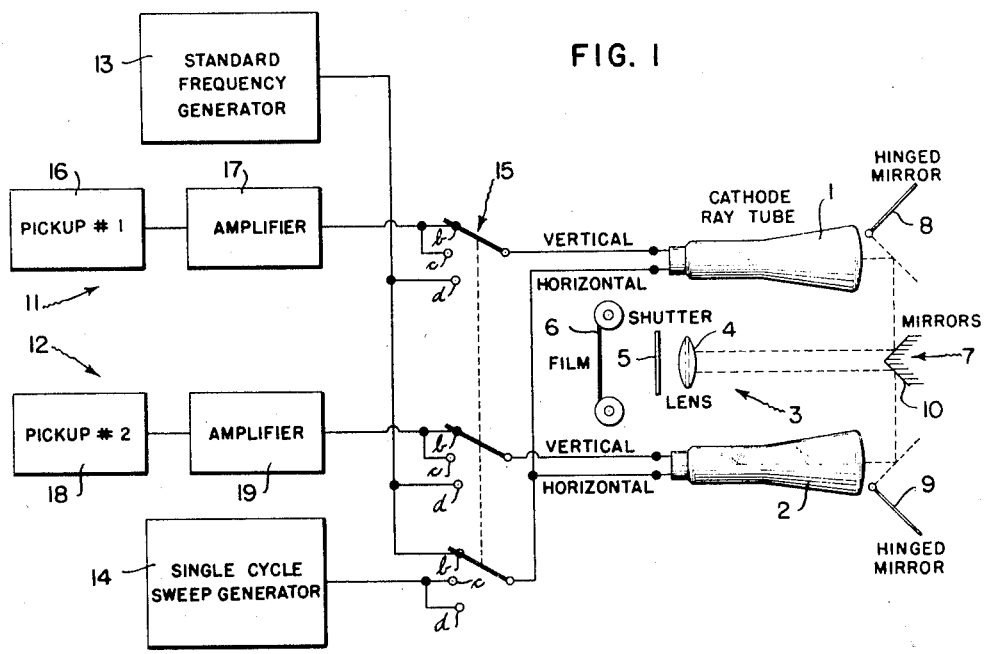
Fig. 1 is a schematic illustration of one form which the vibration recording and viewing apparatus of my invention may assume.

Referring now to Fig. 1, disclosing in schematic form one embodiment of my invention, it will be seen that the vibration recording instrument includes two cathode ray tubes of known type having electron stream forming means as well as vertical and horizontal deflecting plates and indicated by the reference characters 1 and 2, and a camera 3 comprising a lens 4, a movable shutter 5, and a film 6, as well as a mirror arrangement 7 for reflecting the traces on each of the cathode ray tube screens on the lens 4. The mirror arrangement 7 includes a hinged mirror 8 positioned in front of the screen of the cathode ray tube 1 and a hinged mirror 9 positioned in front of the screen of the cathode ray tube 2. A relatively stationary member 10 positioned between the hinged mirrors 8 and 9 and havig two reflecting surfaces disposed at an angle with respect to each other is also provided. One reflecting surface of member 10 is associated with the hinged mirror 8 and the other is associated with the hinged mirror 9 for completing the optical paths from the screens of the cathode ray tubes 1 and 2, respectively, to the lens 4 when the hinged mirrors are in the positions shown in dotted lines.

The vibration recorder also includes two electronic signal amplifying channels designated generally by the reference numerals 11 and 12, a standard frequency generator 13, a single cycle sweep generator 14, and a three-gang, three position switch designated by the character 15. If desired, a push-button or the like switch may be employed in place of the switch 15 for greater convenience.

Each signal channel 11 and 12 includes a pick-up unit of suitable type and electronic amplifying means. Thus, the channel 11 includes a pick-up unit 16 and an electronic amplifier 17 while the channel 12 includes a pick-up unit 18 and an electronic amplifier 19. The pick-up units 16 and 18 are mounted at displaced points on the structure of an airplane in flight and are operative to create undulating signal voltages of wave shape, amplitude, frequency and relative phase relation corresponding to the character of the vibration or flutter at the said points on the airplane structure.

In position b of the switch 15, the amplifiers 17 and 19 in the two pick-up channels are connected to the associated vertical deflecting plates of the cathode ray tubes 1 and 2, while the standard frequency generator 13, which generates saw tooth waves, is connected to the horizontal deflecting plates of both of the cathode ray tubes. Preferably, the hinged mirrors 8 and 9 and the camera shutter 5 are mechanically coupled to the switch 15 so that when the latter is in its position b, the camera shutter 5 is closed and the hinged mirrors 8 and 9 are in their full line positions, and the traces on the cathode ray tubes 1 and 2 may be viewed directly. If desired, the said traces may be observed by means of mirror means (not shown) which may be provided near the lens 4 in the same manner as is illustrated in Fig. 9. When the cathode ray tube traces are viewed by such alternative mirror means, the hinged mirrors 8 and 9 are adjusted into and continuously maintained in their dotted line positions.

This observing or viewing position of the switch 15, shutter 5, and mirrors 8 and 9 is provided for the purpose of enabling the observer to inspect the peak-to-peak amplitude of the traces in order to permit adjustment of the signal amplification until traces of the amplitude suitable for recording on the film 6 are obtained. To this end each of the amplifiers 17 and 19 desirably includes suitable means to adjust the signal amplification. Such means for adjusting the signal amplification may comprise means known and available in the prior art for such purposes. By way of example, attenuating means as disclosed in Figs. 3 and 4 and described hereinafter may be employed. It is noted that a defined trace pattern will not be obtained in most cases since no provision is made for adjusting the standard frequency generator to a frequency commensurate with the signal frequencies. If desired, however, an adjustable standard frequency generator may be provided for permitting such adjustment of the horizontal sweep frequency on the cathode ray tubes.

After amplitude adjustment of the traces on the cathode ray tube screens has been effected, switch 15 is adjusted into its position c, in which the amplifiers remain connected to the respective vertical deflecting plates of the cathode ray tubes 1 and 2, while the horizontal plates are switched to the single cycle sweep generator 14. The generator 14 is actuated by the switching action and produces a single horizontal linear sweep at a predetermined speed. Preferably, the speed of the sweep is adjustable, in steps, so as to make the sweep speed commensurable with the signal frequencies. To this end the single cycle sweep generator may be of the type disclosed and described in connection with Fig. 3. It is noted that the provision of a single sweep eliminates the necessity of adjusting the rate of sweeping speed to match the signal frequencies.

When the switch 15 is brought into position c, the shutter 5 of the camera is opened so that the trace may be recorded on the film. At the same time the optical path from the cathode ray tube screens and the lens 4 to the observer is closed so as to prevent extraneous light from falling on the film.

After having recorded the traces on the screens of both cathode ray tubes 1 and 2 in the manner just described, the switch 15 is moved into its position d in which the standard frequency generator is connected to the vertical deflecting plates of one or both of the cathode ray tubes, while the single cycle sweep generator 14 remains connected to the horizontal plates. The switching action again releases the sweep generator and a trace produced by the standard frequency generator is also recorded on the film and serves as a marking indicative of time with which the recorded signals can be compared to determine their frequency, at least approximately. In the position d of the switch 15 the shutter 5 remains open and the hinged mirrors 8 and 9 are in their dotted line positions.

Upon completion of the foregoing operations, the switch 15 is returned to its position b, the exposed film is removed, and the instrument is ready for preparation for the next observing and recording operations.

In the measuring instrument disclosed in Fig. 1, it is contemplated that the pick-up units 16 and 18, the amplifiers 17 and 19, and the standard frequency generator 13 and the single cycle generator 14 may all be of known type. One form which each of these units may take, however, is disclosed in Figs. 3–6 wherein I have illustrated in detail a preferred embodiment of the invention. The pick-up units 16 and 18 may be of the velocity type or may be of the strain gauge type, both of which types are now commercially available. It is noted that when the pick-up units 16 and 18 are of the velocity type the undulating signal voltages created thereby vary in accordance with a differential function of the vibration or flutter to which the pick-up unit is responsive, and hence, it is desirable to include in the amplifiers 17 and 19 suitable means to integrate the signal voltages to derive a voltage undulating in linear accordance with the vibration or flutter under observation. One arrangement which may be employed for this purpose is shown in Fig. 4.

In order for the measuring equipment of Fig. 1 to be completely self-contained, thereby enhancing its usefulness as a portable instrument, it desirably is designed for D. C. operation and to this end suitable batteries are provided to supply the necessary amplifier, standard and single cycle sweep frequency generator and cathode ray tube currents and voltages.

Figure 2:
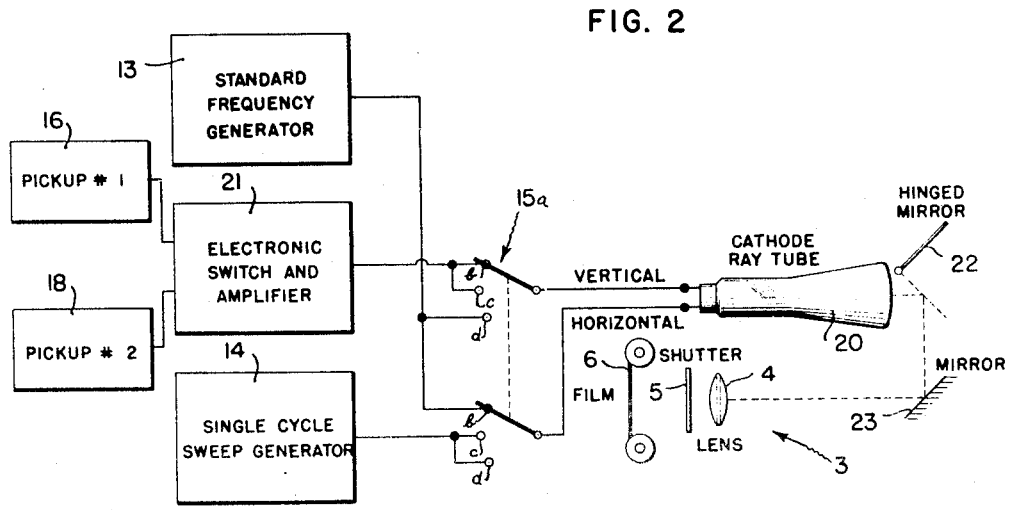
Fig. 2 illustrates a modification of the arrangement of Fig. 1 wherein only a single cathode ray tube is utilized.

Due to the relatively heavy filament current required by cathode ray tubes, which is supplied by batteries, the arrangement shown schematically in Fig. 2 is now considered preferable over that of Fig. 1 in that only a single cathode ray tube, indicated by the numeral 20, is required. In order to permit simultaneous recording of both vibration signals by means of the single cathode ray tube, an electronic switch is provided for combining the said signals. The electronic switch may be of known type and desirably may be incorporated in an electronic switch and electronic amplifier indicated by the numeral 21. A two-gang switch indicated at 15a is provided for accomplishing the desired observing and recording operations. The arrangement of Fig. 2 also includes a standard frequency generator 13, a single cycle sweep generator 14, a camera 3, and a hinged mirror 22 and an associated stationary mirror 23 for reflecting the traces on the screen of cathode ray tube 20 to the lens 4.

It is believed that the operation of this embodiment of my invention will be evident from the description of the operation of the arrangement of Fig. 1, particularly in view of the description given hereinafter of the arrangement of Figs. 3–12. Suffice it to say at this point that the electronic switch and amplifier 21 operates to alternately impress at high speed on the vertical deflecting plates of the cathode ray tube 20 the vibration signal voltages created by each of the pick-up units 16 and 18. Thus, simultaneous traces are produced on the screen of the cathode ray tube corresponding to each of the vibration signals. Preferably, suitable means are incorporated in the arrangement for separating the traces so that they do not overlap and are readily distinguishable. Means for accomplishing this result are disclosed and described in connection with Figs. 3 and 4 hereinafter.

In Figs. 3 through 12 I have illustrated, more or less diagrammatically, a preferred embodiment of my invention, comprising a two channel vibration indicator and recorder which is self-contained and is adapted to be carried on the lap of the pilot or observer. This preferred embodiment provides simultaneous recording of two individual vibrations and also of a marking signal of known frequency for determining the frequencies of the recorded vibrations. The instrument constituting my preferred embodiment is battery operated, completely self-contained, small in overall dimensions, and light in weight and is particularly useful in making tests of equipment where space is limited and weight is an important factor. For clearness of illustration, parts corresponding to those in Figs. 1 and 2 have been indicated by the same reference characters in Figs. 3–12.

The vibration recorder shown schematically in Fig. 3 includes two electronic signal amplifying channels indicated generally by the numerals 24 and 25, and each of which includes an attenuator, a first amplifier, an integrator, and a second amplifier. The channels 24 and 25 may be identical and are shown in detail in Fig. 4. Channel 24 includes an attenuator 26, a first amplifier 27, an integrator 28, and a second amplifier 29, while the channel 25 includes an attenuator 30, a first amplifier 31, an integrator 32 and a second amplifier 33. Vibration pick-up units 16 and 18 are connected to the input terminals of the attenuators 26 and 30, respectively. The vibration pick-up units may be of either the velocity type or of the linear strain gauge type. Attenuators 26 and 30 are provided to regulate the amplitude of the signal voltage impressed on the input circuit of the associated first amplifier from the vibration pick-up units.

A two-gang, two position switch indicated at 34 is provided for connecting the integrator 28 into the channel 24 or for disconnecting it from that channel. A similar two-gang, two position switch indicated at 35 is provided for inserting or removing the integrator 32 from the channel 25. In positions c of each of the switches 34 and 35, the integrators 28 and 32 are disconnected from their associated channels and the output circuit of each first amplifier 27 and 31 is connected to the input circuit of its associated second amplifier 29 and 33. The switches 34 and 35, when adjusted to their positions b, connect the integrators 28 and 32 between the output circuit of the first amplifier and the input circuit of the second amplifier of the associated channel. Preferably, the switches 34 and 35 are ganged together so that the insertion and removal of the integrators 28 and 32 from their associated channels may be accomplished by means of the manipulation of a single control device or knob.

The arrangement of Fig. 3 also includes a pair of electronic switches designated by the characters 36 and 37, a multivibrator 38, a third amplifier indicated generally by the numeral 39, a cathode ray tube 20, a combined standard frequency and single cycle sweep generator indicated generally by the character 40, and a marking signal or time reference generator designated generally at 41. A camera 3, comprising a hinged mirror 22, a lens 4, a shutter 5 and a film 6 is provided for recording the traces on the screen of the cathode ray tube 20. Suitable means as described in connection with Figs. 9, 10 and 11 are provided for permitting visual observation of the cathode ray tube screen.

In the normal operation of the instrument, signal voltages created by the vibration pick-up units are impressed on the input terminals of each of the attenuators 26 and 30 which, depending upon their adjustment, impress more or less of the bivration signal voltages on the input terminals of their respectively associated first amplifiers 27 and 31. From the first amplifiers 27 and 31, the amplified vibration signal voltages are impressed on the input terminals of the second amplifiers 29 and 33 either directly or through the associated integrator 28 or 32, depending upon whether the switches 34 and 35 are in their c position or in their position b.

Each of the amplified vibration signal voltages is further amplified by the second amplifiers in the channels 24 and 25. Passing from the second amplifiers the amplified vibration signal voltages in each channel are impressed on the input circuit of the respectively associated electronic switch 36 or 37. The electronic switches 36 and 37 operate to alternatively impress at the frequency of 25,000 cycles per second first one amplified vibration signal voltage and then the other on the input circuit of the third amplifier 39. This high speed and alternate switching action is accomplished by means of the operation of the multivibrator 38 which keys the electronic switches 36 and 37, the keying being such that one switch is conductive while the other is nonconductive. The input circuits of the electronic switches 36 and 37 are biased to different extents and different screen grid voltages are employed, as is explained in detail hereinafter, so that the extent to which the electronic switch 36 is adapted to become conductive to pass vibration signal voltages of normal amplitude is different from that to which the electronic switch 37 is adapted to become conductive to pass vibration signal voltages of corresponding amplitude.

From the third amplifier 39 which operates to further amplify each of the vibration signal voltages, the amplified vibration signal voltages are impressed on the vertical deflecting plates of the cathode ray tube 20. The output terminals of the sweep generator 40 are connected to the horizontal deflection plates of the cathode ray tube. In one of its operating conditions the sweep generator 40 impresses a recurrent sweep voltage on the horizontal deflecting plates of cathode ray tube 20 for permitting observation of the signal voltage traces on the screen of the cathode ray tube, while in its other operation condition it impresses a single sweep voltage on the horizontal deflecting plates for photographic recording. A two-gang, two position switch indicated generally at 42 is provided for adjusting the sweep generator into one or the other of its operating conditions. A push-button 43 is provided, as shown, so that when the sweep generator 40 is adjusted to its operating condition in which it produces only a single voltage, the occurrence and impression on the horizontal deflecting plates of the cathode ray tube 20 of that single voltage are delayed until the push-button 43 is closed. The switch 42 constitutes part of a switching arrangement referred to hereinafter as a "function switch."

By means of a two position switch indicated at 44, the output terminals of the marking signal generator 41 may be connected to the vertical deflecting plates of the cathode ray tube 20 and the output circuit of the third amplifier 39 disconnected therefrom, thereby providing a time reference marking or trace on the cathode ray tube screen which may be recorded on the same film as that on which the vibration signals are recorded. Suitable bias means are provided when the marking signal generator is connected to the vertical deflecting plates of the cathode ray tube 20 so that the trace produced thereby is vertically displaced from the vibration signal voltage traces. Since the input circuits of the electronic switches 36 and 37 are biased to different extents, the vibration signal voltage trace representing the vibration signal voltage transmitted through channel 24 will be vertically displaced from the other vibration signal voltage trace.

In Fig. 4 I have illustrated in detail one practical operating arrangement of the channels 24 and 25. Since the channels 24 and 25 are identical, only one channel has been shown in detail in Fig. 4. It is noted that both channels not only are identical but both may be, and preferably are, supplied with energizing voltages from the same batteries. Such double utilization of the energizing batteries is desirable inasmuch as it reduces both the overall dimensions and weight of the instrument. Fig. 4 also shows one practical working arrangement of electronic switch 36 or 37 which may be employed and its manner of connection to the output terminals of the respectively associated channel 24 or 25. The electronic switches 36 and 37 may be and preferably are identical as to the components contained and their manner of interconnection, but as previously noted, different biasing voltages are impressed on their input circuits and different voltages are impressed on their screen grid circuits for the purpose of effectuating vertical displacement on the screen of cathode ray tube 20 of the two vibration signal traces. The specific differences between the two electronic switches 36 and 37 will become apparent as the description proceeds. In order to maintain at a minimum the number of batteries required in the instrument, the same batteries preferably are employed for energizing both of the electronic switches.

For convenience of illustration it will be assumed that the channel and electronic switch shown in Fig. 4 constitutes the channel 24 and the electronic switch 36. It will be understood that the explanation of the construction and manner of operation of this channel and electronic switch will apply also to the other channel 25 and electronic switch 37.

The attenuator 26, as shown in Fig. 4, is a high impedance step type attenuator and is provided for the purpose of reducing the amplitude of the vibration input signals before impressing them on the input circuit of the first amplifier 27. Such reduction is desired in order to suitably relate the amplitude of the vibration input signals to the overall amplification of the channel 24 and of the third amplifier 39 so that traces of the proper amplitude are produced on the screen of the cathode ray tube 20. Thus, it is possible by a simple manipulation of the control dials of the attenuators 26 and 30 to so adjust the amplitudes of the vibration signal traces that the amplitudes of both traces are approximately the same with no overlapping of the traces. Accordingly, the vibration signal traces are readily distinguishable from each other when the attenuators 26 and 30 are properly adjusted.

As shown, the attenuator 26 is made up of a number of series connected resistances $R_1$ through $R_{13}$, a corresponding number of stationary contact points $b$ through $o$, and a contact arm $p$ pivoted at one end and adapted to engage one of the contacts $b$ through $o$ depending upon the position to which it is adjusted. Essentially, the attenuator 26 is a voltage divider resistance, the full vibration signal voltage generated by the pick-up unit 16 being impressed across all of the resistances $R_1$ through $R_{13}$ in series, and a variable part of that voltage being tapped off by the switch arm $p$ depending upon which contact $b$ through $o$ it happens to engage.

By way of illustration, it is noted that the values of the resistances $R_1$ through $R_{13}$ in a working arrangement of the preferred embodiment of my invention are as follows:

| | | |
|---|---|---|
| $R_1$ | megohm | 0.5 |
| $R_2$ | do | 0.25 |
| $R_3$ | do | 0.15 |
| $R_4$ | ohms | 50,000 |
| $R_5$ | do | 25,000 |
| $R_6$ | do | 15,000 |
| $R_7$ | do | 5,000 |
| $R_8$ | do | 2,500 |
| $R_9$ | do | 1,500 |
| $R_{10}$ | do | 500 |
| $R_{11}$ | do | 250 |
| $R_{12}$ | do | 150 |
| $R_{13}$ | do | 100 |

When the values of resistances $R_1$ through $R_{13}$ are so chosen, the attenuator 26 provides voltage outputs related to the full amplifier voltage gain in the following ratios: 1.0, 0.5, 0.25, 0.1, 0.05, 0.025, 0.01, 0.005, 0.0025, 0.001, 0.0005, 0.00025, and 0.0001.

The first amplifier 27 comprises a resistance coupled stage and incorporates suitable means known in the art to provide low frequency compensation for the purpose of providing a signal in its output circuit having a linear frequency response for frequencies varying at least over a range of 5 to 300 cycles per second. The low frequency compensation is obtained by means of a resistance 45 and a parallel connected condenser 46 in the plate load of the vacuum tube 47 included in the amplifier 27.

Tube 47 is a pentode type and desirably is of the commercially available type 1L4 including plate, suppressor grid, screen grid, control grid and filament type cathode elements. This tube of the miniature type, has been found to give satisfactory results as a high gain, wide band amplifier tube as it is employed in amplifier 27. Its small size and low filament drain enhance its usefulness in the preferred embodiment of my vibration recorder. Energizing current is supplied to the filament type cathode from a low voltage "A" battery designated by the character A1 and which also is connected to and supplies energizing current to the filament type cathodes of tubes 48 and 49, respectively included in the second amplifier 29 and the electronic switch 36. Preferably, the battery A1 also is connected to and supplies energizing current to the filament type cathodes of the tubes included in the channel 25 and in the electronic switch 37. In this manner the number of filament energizing batteries is maintained at a minimum.

As shown, the terminal of the filament cathode of tube 47 which is connected to the positive terminal of battery A1 is connected directly to ground indicated at G and is also connected to the positive terminal of a so-called "C" battery designated by the character C1. The negative terminal of battery C1, which may desirably provide six volts between its positive and negative terminals, is connected to the stationary contact $o$ on the attenuator 26, while the movable contact arm $p$ is directly connected to the control grid of tube 47. Accordingly, a unidirectional potential from battery C1 and an undulating vibration signal from the pick-up unit 16 are impressed in series between the cathode and control grid of tube 47, the potential from battery C1 operating to render the control grid suitably negative in potential with respect to the potential of the cathode for the proper operation of tube 47.

Plate and screen grid voltages are supplied the tube 47 from a "B" battery designated by the character B1 and which is utilized also to supply plate and screen grid voltages to the tube 48 of the amplifier 29. Preferably, the battery B1 also supplies plate and screen grid voltages to the tubes included in the amplifiers 31 and 33 of the channel 25. Battery B1 is a high voltage battery including both 90 and 180 volt taps and also additional voltage taps not employed for energizing the channels 24 and 25 but otherwise employed. The negative terminal thereof is connected to the negative terminal of battery A1 and thereby to the corresponding terminals of the filament cathodes of each of the tubes included in the amplifiers 27, 29, 31 and 33 while the 90 volt tap is directly connected to each of the screen grids and the 180 volt tap is connected to supply energizing voltage to each of the plate circuits. The plate circuit of tube 47 may be traced from the positive 180 volt tap on battery B1 through the parallel connected resistance 45 and condenser 46, a resistance 50, the plate of tube 47, and the cathode thereof to the negative terminal of battery B1.

The plate circuit of the tube 47 is resistance-capacity coupled to the input circuit of the second amplifier 29, either directly or through the integrator 28 depending upon the position to which the switch 34 is adjusted. Specifically, the plate of tube 47 is connected by a condenser 51 to the left switch arm of switch 34 as seen in the drawing. A resistance 52 having its upper terminal connected to the condenser 51 when the switch 34 is in its position $c$, has its other terminal connected through the battery C1 to the grounded terminal of the filament cathodes of tubes 47 and 48. By means of this connection the undulating voltage component appearing in the plate circuit of tube 47 and constituting the amplified vibration signal is impressed on the resistance 52 which, in turn, is connected to the input circuit of the second amplifier 29. When the switch 34 is in its position $b$, the amplified vibration signal is impressed on the resistance 52 through the integrator 28.

As shown, the integrator 28 is comprised of a resistance 53 and a condenser 54 adapted to be connected in series in the order named between the condenser 51 and ground G when the switch 34 is in its position $b$. When switch 34 is in its latter position, the undulating voltage component appearing across the condenser 54 is impressed on resistance 52 and thereby on the input circuit of the second amplifier 29. Accordingly, with the integrator 28 operatively connected between the first and second amplifiers, the vibration signal impressed on the input circuit of the second amplifier varies in accordance with the charge on the condenser 54, thus having the effect of integration, as those skilled in the art will understand and which it is believed will become evident from a study of the graph shown in Fig. 5 and the following explanation.

In Fig. 5 the saw tooth curve V1 represents the wave shape, frequency and amplitude of the vibration to which pick-up unit 16 is subjected. When the pick-up unit 16 is of the velocity type, it creates a vibration signal voltage having a square wave characteristic as shown by curve V2 directly below curve V1. Curve V2 represents the first derivative of the curve V1. Curve V3, directly below both of the other curves, represents the wave shape of the voltage appearing across condenser 54 of the integrator 28 and impressed on the input circuit of amplifier 29. It will be noted that curve V3 is substantially a replica of the curve V1.

This translation of the vibration signal appearing in the plate circuit of tube 47 having a wave shape as shown by curve V2 into a vibration signal having a wave shape as shown by curve V3 is accomplished by proper utilization of the charging characteristic of a condenser. For example, on the positive half cycle of the square wave vibration voltage signal impressed on resistance 53 and condenser 54 of the integrator 28, the charge on the condenser 54 will gradually increase until the half cycle is over. On the next half cycle the polarity of the square wave vibration voltage reverses, causing the charge on condenser 54 to gradually decrease. Consequently, a sawtooth voltage wave of the shape shown in curve V3 is produced across the condenser 54. This sawtooth wave corresponds exactly to the original vibration being indicated and recorded and varies linearly with respect thereto.

While, for purposes of illustration, sawtooth and square waves have been referred to and shown, it will be evident that such integration will be effectuated by the integrator 28 regardless of the characteristic wave shapes of the original vibration and the vibration signal voltage produced by the pick-up unit 16. It will be understood that when the vibration pick-up unit 16 is of a type which develops a vibration signal voltage varying in linear accordance with the vibration under detection, it is not necessary to employ the integrator 28, and therefore, the latter is switched out of the network by adjustment of the switch 34 to its position c.

The second amplifier 29 comprises a resistance coupled stage which is substantially identical to the amplifier 27 and also includes low frequency compensation means comprising a parallel connected resistance 55 and condenser 56 connected in the plate load of tube 48 for assuring that linear frequency response of the signals in the output circuit of tube 48 is obtained at least over a range of frequencies varying from 5 to 300 cycles per second.

Tube 48 also is a pentode, and desirably of the commercially available type 1L4, and includes the same elements as tube 47. As previously noted, filament energizing current is supplied tube 48 from battery A1 and screen and plate voltages are supplied tube 48 from battery B1. The input circuit of tube 48 may be traced from the control grid to the upper terminal of resistance 52, through the latter to the negative terminal of battery C1, and from the positive and grounded terminal of the latter to the filament type cathode. The plate circuit may be traced from the positive 180 volt tap on battery B1 to the parallel connected resistance 55 and condenser 56, a resistance 57, the plate of tube 48 and the cathode thereof to the negative terminal of the battery.

The plate circuit of tube 48 is resistance-capacity coupled by means of a condenser 58 and a resistance 59 to the input circuit of the tube 49 included in the electronic switch 36. Tube 49, which may be of the type known as pentagrid converters and desirably of the miniature, commercially available type 1R5, includes a plate, a suppressor grid element, a pair of screen grid elements, a pair of control grid elements, and a filament type cathode to the latter of which energizing current is supplied by the battery A1 and the positive terminal of which is grounded at G. The control grid of the tube 49 ordinarily regarded as the second control grid is connected through condenser 58 to the plate of tube 48 and is also connected through resistance 59 to the 3 volt negative tap on a "C" battery designated by the character C2. Battery C2 is also provided with 1½ volt, 6 volt, 10½ volt and 13½ volt taps, but in order to avoid complication of Fig. 4, only the 1½ volt and 3 volt taps are shown therein. The positive terminal of battery C2 is connected to the filament cathode of tube 49. Thus, battery C2 is utilized to provide a proper biasing potential for the second control grid of tube 49.

Battery C2 is employed also to provide suitable biasing potentials to the input circuit of amplifier 39 and sweep generator 40 as well as to the input circuit of the tube included in the electronic switch 37 and corresponding to the tube 49. It is noted that the second control grid of the tube in switch 37 is connected through a resistance corresponding to the resistance 59 to the 1½ volt negative tap on the battery C2. Biasing voltage is supplied to the first control grids of each of the tubes in the electronic switches 36 and 37 from the 3 volt negative tap on battery C2 so that the first control grid of each tube is biased to the same extent. As shown in Fig. 4, the first control grid of tube 49 is connected through a resistance 60 to the negative 3 volt tap of battery C2. The first control grid also is connected to a first output circuit of the multi-vibrator 38 by means of a conductor 61. The first control grid of the tube in the electronic switch 37 is connected by a conductor 62, as seen in Fig. 3, to a second output circuit of the multi-vibrator 38.

Plate and screen grid voltages are supplied to the tube 49 and also to the tube in electronic switch 37 from a "B" battery designated by the character B2 and provided with 45 volt, 67½ volt, 90 volt, and 180 volt taps. In Fig. 4 the 180 volt tap of battery B2 has been omitted to simplify the drawing. The plate circuit of the tube 49 may be traced from the positive 90 volt tap on battery B2 through a parallel connected resistance 63 and a condenser 64, an inductance element or peaking coil 65, a resistance 66 to the plate of tube 49 and the filament cathode to the negative terminal on battery B2. In the electronic switch 36 the screen grids of tube 49 are connected to the positive 45 volt tap on battery B2 while in the switch 37 the screen grids of the corresponding tube are connected to the positive 67½ volt tap.

This difference in the potentials on the second control grids and on the screen grids of the tubes in the electronic switches 36 and 37 is provided so that the tube in switch 37 will have a larger plate current than the tube 49 in switch 36. By virtue of the plate current difference, the two output vibration signal voltages from the electronic switches 36 and 37 are impressed at different levels through the same channel on the vertical deflecting plates of cathode ray tube 20. As a consequence, the traces produced on the oscillograph screen and corresponding to the two vibration signal voltages are vertically displaced from each other, do not overlap, and are readily distinguishable.

In the preferred embodiment of my invention, the tubes in the electronic switches 36 and 37 are keyed 180° out of phase with each other and at the high frequency of 25,000 cycles per second by voltages of square wave characteristic derived from the multi-vibrator 38 and impressed on the first control grid of each tube as aforementioned. Thus, the square wave voltage impressed on one first control grid operates to render its associated tube non-conductive during one half cycle while the square wave voltage impressed on the other first control grid operates to render the associated tube non-conductive during the other half cycle. As a consequence, one tube conducts during one half cycle and the other tube conducts during the next half cycle of the high frequency voltage output of multi-vibrator 38 whereby the vibration signal voltages in the channels 24 and 25 are impressed during alternate half cycles of said high frequency on the input circuit of the third amplifier 39 and are reproduced during said alternate half cycles in the output circuit of amplifier 39, and consequently, are alternately impressed at said high frequency on the vertical deflecting plates of cathode ray tube 20. While each trace on the screen of the cathode ray tube appears continuous, it is, therefore, actually composed of a series of dashes each representing one half of the high frequency keying cycle. The keying frequency is so high, however, that the dashes appear to merge and present apparently continuous traces.

The parallel connected resistance 63 and condenser 64 in the plate circuit of tube 49 are employed to provide low frequency compensation for assuring that the vibration signal will have a linear frequency response at least over the range of 5 to 300 cycles per second. Since the electronic switches 36 and 37 are keyed at the high frequency of 25,000 cycles per second, it is desirable to also provide high frequency compensating means in the plate circuits of the tubes of the electronic switches to assure the attainment of such linear frequency response. Such high frequency compensation is obtained by means of the peaking coil 65, the operation of which in accomplishing this end is known in the art and need not be described herein.

Merely by way of illustration, it is noted that each of the channels 24 and 25 and the electronic switches 36 and 37 in a practical operative construction utilizing the type tubes and battery voltages already mentioned is comprised of components having the following electrical characteristics:

| | | |
|---|---|---|
| Resistance 45 | ohms | 50,000 |
| Resistance 50 | do | 50,000 |
| Resistance 52 | megohm | 1 |
| Resistance 53 | do | 0.25 |
| Resistance 55 | ohms | 50,000 |
| Resistance 57 | do | 50,000 |
| Resistance 59 | megohm | 1 |
| Resistance 60 | do | 0.25 |
| Resistance 63 | ohms | 20,000 |
| Resistance 66 | do | 15,000 |
| Condenser 46 | microfarads | 4 |
| Condenser 51 | do | 0.1 |
| Condenser 54 | do | 0.1 |
| Condenser 56 | do | 4 |
| Condenser 58 | do | 0.1 |
| Condenser 64 | do | 16 |
| Inductance element 65 | millihenries | 2.5 |

While the multi-vibrator 38 is essentially a relaxation oscillator and may be of known type, I prefer to employ a multi-vibrator of the construction shown in detail in Fig. 6 because that construction, at the relatively high frequency of operation of 25,000 cycles per second, provides oscillating voltages having a better square wave characteristic than it is possible to generate by the multi-vibrators of conventional type.

The multi-vibrator 38 shown in Fig. 6 comprises a two-stage resistance-capacitance coupled non-linear amplifier in which the output circuit of each stage is connected back to the input circuit of the other stage. The stages have been indicated by the reference numerals 67 and 68, respectively. Stage 67 includes a pentode tube 69 and stage 68 includes a pentode tube 70. Each of the pentode tubes 69 and 70 may be of the commercially available miniature type 1S4 including plate, suppressor grid, screen grid, control grid, and filament type cathode elements. Energizing current is supplied to the filament type cathodes of the tubes 69 and 70 from an "A" battery designated by the character A2 and which provides 1½ volts.

Plate and screen grid voltages are provided the tubes 69 and 70 from the battery B2, each of the screen elements being directly connected to the 67½ volt taps, while the plate of tube 69 is connected through a resistance 71 to the 90 volt tap and the plate of tube 70 is connected through a resistance 72 to the 90 volt tap. The negative terminal of battery B2 is connected through a biasing resistance 73 to the cathode of each tube.

As shown, a pair of series connected resistances 74 and 75 is connected between the negative terminal of battery B2 and the 90 volt tap and the point of engagement of these resistances is connected to the junction point of one end of each of two resistances 76 and 77. The other end of resistance 76 is connected to the control grid of tube 69 and also through a condenser 78 to the anode of tube 70 while the other end of resistance 77 is connected to the control grid of tube 70 and also through a condenser 79 to the anode of tube 69.

One output terminal 80 of the multi-vibrator is connected through a condenser 81 to the anode of tube 69 and the other output terminal 82 is connected through a condenser 83 to the anode of tube 70. The output terminal 80 is connected directly to the control grid of the tube 49 in the electronic switch 36 while the output terminal 82 is connected directly to the control grid of the corresponding tube in the electronic switch 37. In the operation of the multi-vibrator 38, the tubes 69 and 70 are alternately driven to cut off, one tube being fully conductive while the other is non-conductive, and consequently, the voltage appearing between terminal 80 and ground is displaced 180° from the voltage appearing between terminal 82 and ground. These voltages each have a square wave shape and are of the high frequency of 25,000 cycles per second and when impressed on the control grids of the tubes in the electronic switches 36 and 37 operate to render one and then the other of said tubes non-conductive at said high frequency.

Resistances 74 and 75 connected across battery B2, as shown, comprise a voltage divider and are provided for the purpose of permitting the use of a biasing resistance 73 of sufficiently high value to produce the desired square wave shape at the output terminals 80 and 82 without resultant biasing of both tubes 69 and 70 to cut off at the same time. This end is accomplished by impressing the positive voltage obtained across resistance 74 on the control grids of tubes 69 and 70. In this manner it is possible to employ a biasing resistance of high value and at the same time operate the tubes 69 and 70 at their normal bias voltages.

While there are commercially available several miniature tubes which may be employed in the multi-vibrator, I prefer to employ the 1S4 because of its high output and excellent stability.

By way of illustration, when type 1S4 tubes are employed in the multi-vibrator 38 and the voltages referred to are impressed on the plate and screen grids, the various circuit components may desirably have the following characteristics:

| | | |
|---|---|---|
| Resistor 71 | ohms | 10,000 |
| Resistor 72 | do | 10,000 |
| Resistor 73 | do | 40,000 |
| Resistor 74 | megohm | 0.1 |
| Resistor 75 | do | 0.1 |
| Resistor 76 | do | 0.1 |
| Resistor 77 | do | 0.2 |
| Condenser 78 | micro-microfarads | 100 |
| Condenser 79 | do | 100 |
| Condenser 81 | microfarad | 0.005 |
| Condenser 83 | do | 0.005 |

The marking signal generator 41 shown in detail in Fig. 3 is essentially a relaxation oscillator and is characterized in that it is operative in different conditions of adjustment to generate oscillating voltages of different frequency and also of correspondingly different wave shape. Accordingly, the frequency of the oscillating voltage produced by the marking signal generator and recorded by means of the cathode ray tube 20 and the associated camera 3 may be readily identified from the wave shape of the marking signal voltage, as may be seen by reference to Fig. 7.

As shown, the marking signal generator 41 includes a tube 84 containing two similar triodes designated by the numerals 85 and 86 within the same envelope. Tube 84 may desirably be of the commercially available type 1G6. It is noted that the use of pentode tubes in place of each of the triodes 85 and 86 would make possible greater voltage output from the generator 41, but this is not necessary or even desirable. In addition, the use of the one tube 84 adds to the compactness of the vibration indicator and recorder.

Triodes 85 and 86 each include plate, control grid and filament type cathode elements. Energizing current is supplied to the filament type cathodes from an "A" battery indicated by the character A3 and which is operative to provide 1½ volts. Plate voltage is supplied to each of the triodes 85 and 86 from the battery B1. Thus, the plate circuit of triode 85 may be traced from the positive 90 volt tap on battery B1 through a resistance 87 to the plate of triode 85, the cathode thereof, and a selected one of three resistances 88, 89 or 90, depending upon the position of a three position switch indicated at 91, to the grounded and negative terminal of battery B1. Similarly, the plate circuit of triode 86 may be traced from the positive 90 volt tap on battery B1 through a resistance 92 to the plate of triode 86 and from the cathode to the negative terminal of battery B1 through the selected one of resistances 88, 89, or 90. As shown, a condenser 93 is connected from the plate of triode 86 to ground.

The output circuit of triode 85 is coupled by means of a condenser 94 and a resistance 95 to the input circuit of triode 86. Specifically, the plate of triode 85 is connected by condenser 94 to the control grid of triode 86 and the said control grid is connected by resistance 95 to ground. The control grid of triode 85 is connected by a similar resistance 96 to ground. A switch indicated at 97 and comprising a part of the aforementioned function switch is provided for short circuiting the resistance 95 for the purpose of stopping the oscillations of the marking signal generator. It is desirable to prevent the marking signal generator from oscillating during the intervals when the vibration signal voltage traces are being produced on the screen of the cathode ray tube 20 in order to prevent possible interference with and distortion of those traces by the oscillations of the marking signal generator.

The output circuit of triode 86 is arranged to be coupled by means of a condenser 98, a resistance 99, a potentiometer resistance 100 including a contact 101 adjustable therealong, and the switch 44, when the latter is in its position c, to the vertical deflecting plates of the cathode ray tube 20. Potentiometer resistance 100 is provided for the purpose of adjusting the vertical position of the marking signal trace on the screen of cathode ray tube 20. To this end, one terminal of resistance 100 is connected to the positive 540 volt and grounded terminal of a "B" battery indicated by the character B3, and the other terminal is connected to the positive 472½ volt terminal on battery B3. Thus, a potential of 67½ volts is impressed across resistance 100. A variable part of this voltage drop is adapted to be impressed on the cathode ray tube vertical deflecting plates depending upon the position along the length of resistance 100 to which the contact 101 is adjusted.

For purposes of illustration it is noted that the various circuit components of the marking signal generator may have the following characteristics:

| | | |
|---|---|---|
| Resistance 87 | megohm | 1 |
| Resistance 88 | ohms | 5,000 |
| Resistance 89 | do | 2,900 |
| Resistance 90 | do | 1,100 |
| Resistance 92 | do | 5,000 |
| Resistance 95 | megohm | 0.5 |
| Resistance 96 | do | 0.5 |
| Resistance 99 | do | 0.5 |
| Resistance 100 | do | 1 |
| Condenser 93 | microfarad | 0.02 |
| Condenser 94 | do | 0.10 |
| Condenser 98 | do | 0.5 |

The marking signal generator 41, as previously noted herein, is essentially a relaxation oscillator. Its manner of operation is generally like that of the so-called Potter circuit described in detail in a paper appearing on pages 713 to 719 of volume 26, Number 6 of the I. R. E. Proceedings dated June, 1938, and therefore, requires no detailed explanation herein. The character of the operation of the marking signal generator 41 is different in one important respect from the known Potter circuit, however, in that the frequency of oscillation is varied by changing the amount of cathode bias, as by connection of a selected one of resistances 88, 89 or 90, into the cathode circuit, instead of by variation in the value of one or more of the circuit components 87, 92, 93 and 94 as contemplated in the above referred to paper. When the frequency of oscillation is varied by changing the cathode bias, the characteristic wave shapes of the oscillations at each different frequency are sufficiently different so that the frequency of the oscillations may be readily determined from their wave shape whereas there is little or no difference in the wave shapes of the oscillations of different frequency when the frequency variations are accomplished in the prior art manner, exemplified by the above paper.

In Fig. 7 I have illustrated representative wave shapes of the oscillations produced by the marking signal generator 41 when the switch 91 is adjusted into each of its positions b, c, and d. Switch 91 is adapted to be adjusted into each of said positions for causing the generator to produce oscillations having frequencies of 24, 40, and 100 cycles per second, respectively, which oscillating frequencies and their characteristic wave shapes are shown by the curves M1, M2, and M3, respectively. It is apparent from even casual observation of these curves that they are readily distinguishable.

The sweep generator 40, disclosed in detail in Fig. 3, serves to provide a recurrent sweep for visual observation of the vibration signal and marking signal traces on the screen of the cathode ray tube 20, and also provides a single sweep for photographing. Referring to Fig. 3 it will be noted that the sweep circuit 40 includes in addition to the two-gang switch 42 and the push button 43, a condenser 102, a cold cathode discharge tube 103, a pentode tube 104, resistances 105, 106, 107, and 108, a condenser 109, a sweep frequency switch indicated at 110, and a potentiometer resistance 112 having an associated contact 113.

The cold cathode discharge tube 103 may desirably be of the commercially available type 1C21 and includes plate, control grid and cathode elements. This tube does not utilize a hot cathode, and hence, requires no batteries for supplying filament energizing currents. Resistances 105 and 106 are connected in series between the plate and cathode elements and their point of engagement is connected to the control grid. In position b of the two-gang switch 42 one terminal of condenser 102 is connected to the plate of tube 103 and the other terminal is connected to the cathode. Thus, with the two-gang switch 42 in its position b the plate to cathode resistance of tube 103 and also the series connected resistances 105 and 106 are connected in shunt to the condenser 102.

Pentode tube 104 desirably is of the commercially available type 1S4 and includes plate, suppressor grid, screen grid, control grid and filament type cathode elements. Energizing current is supplied the filament type cathode from the battery A1 which also supplies energizing current to the filament type cathodes of the various amplifier stages and also of the electronic switches.

Switch 110 is a three position switch and is ganged together with the switch 91 employed in connection with the marking signal generator 41 for changing the frequency of operation of the latter. The switch 110 is provided for a similar purpose, namely to vary the sweep frequency of the sweep generator 40. In order to attain this end the switch 110 is adapted to selectively connect the control grid of tube 104 through resistance 108 to different negative voltage taps provided on the battery C2 to thereby change the bias voltage on the control grid. Specifically, in position b of switch 110 the control grid is connected to the negative 13½ volt tap on the "C" battery C2 while in positions c and d the control grid is connected respectively to the negative 10½ volt and 6 volt taps. The manner in which the sweep frequency of the generator 40 is changed by such variation of the bias voltage on the control grid of tube 104 will become apparent as the description proceeds.

Screen grid voltage is supplied tube 104 from the positive 45 volt tap on the "B" battery B2, the negative terminal of which is connected to ground G and thereby to the cathode of tube 104. Plate voltage is supplied the tubes 103 and 104 in series when switch 42 is in its position b from the positive 180 volt tap on the battery B2 through a circuit which may be traced from the said 180 volt tap to one terminal of the parallel network comprised of condenser 102, tube 103, and the resistances 105 and 106, from the other terminal of the parallel network through the switch 42 to the plate of tube 104, and from the cathode thereof to the grounded and negative terminal of battery B2.

In the operation of the sweep generator 40, with the two-gang switch 42 in its b position, charging current flows into condenser 102 through the circuit including the plate to cathode resistance of the pentode tube 104 until the condenser potential reaches the ionization potential of the cold cathode discharge tube 103. The latter then breaks down and discharges the condenser 102 to the extinction potential of the tube 103 which then ceases to conduct and accordingly permits a charge to again build up on the condenser 102. In this manner the charging and discharging cycle of the condenser is made regularly recurrent, the time for each cycle being dependent upon the magnitude of the plate to cathode resistance of tube 104, which, in turn, is determined by the negative bias voltage impressed on the control grid of the latter.

Pentode tube 104 is employed in the circuit conducting the charging current flow to condenser 102 instead of ordinary resistance in order to make the charging rate of condenser 102 linear with respect to time. As those skilled in the art understand, the changing resistance of a pentode tube, as its plate potential changes, provides automatic compensation for the non-linearity of the normal condenser charging curve. By virtue of such compensation the charging rate of condenser 102 is made perfectly linear with respect to time. Due to the action of tube 103 the discharging of condenser 102 occurs substantially instantaneously, and hence, the charging and discharging voltage appearing on condenser 102 has a so-called saw-tooth characteristic.

The saw-tooth voltage so created across condenser 102 is impressed through condenser 109 on the horizontal deflecting plates of the cathode ray tube 20. This sawtooth voltage provides a regularly recurring sweep of the traces produced on the screen of the cathode ray tube for viewing the signals preparatory to making a photographic record for which purpose a single sweep is employed.

In order to provide a suitable bias voltage on the horizontal deflecting plates of tube 20 for centering the traces, resistance 107 and potentiometer resistance 112 are provided for connecting the said horizontal deflecting plates to a point of suitable positive or negative potential with respect to ground as may be required. As shown, one terminal of resistance 112 is connected to the positive 90 volt tap on battery B1 while the other terminal is connected to the negative 67½ volt tap on battery B3. Thus, a potential of 157½ volts is impressed across resistance 112. With this arrangement the traces on the screen of the cathode ray tube 20 may be easily shifted from side to side and brought to a desired position by changing the position of contact 113 along resistance 112.

When the two-gang switch 42 is in its position c, the terminals of condenser 102 are directly connected together, and the plate circuit of the tube 104 is opened so that no current is then drained from battery B2. This arrangement for shorting the terminals of condenser 102 is provided for discharging the condenser between pictures.

Upon adjustment of switch 42 to its position d the shunt circuit about the condenser 102 is opened and the plate circuit of tube 104 is conditioned so that it may be closed only when the circuit is closed by the push-button 43. The circuit through which condenser 102 is then charged does not include the tube 103, nor resistances 105 and 106. On closing the circuit by push-button 43, the condenser 102 charges to saturation through the pentode 104. Since there is no path through which the charge on condenser 102 may leak off the charging action of condenser 102 is not repeated, and consequently, only a single sweep voltage is impressed on the horizontal deflecting plates of cathode ray tube 20.

It is noted that the frequency of the sweep voltage for both the recurrent sweep and the single sweep is varied by changing the bias voltage on the control grid of tube 104. This changes the tube resistance, and therefore, the time constant of the circuit.

By way of example, it is noted that when the tubes 103 and 104 are of the types designated and the various voltages referred to are employed, the various circuit components of the sweep circuit may have the following characteristics:

| | | |
|---|---|---|
| Resistance 105 | megohms | 1 |
| Resistance 106 | do | 1.5 |
| Resistance 107 | do | 2 |
| Resistance 108 | do | 0.5 |
| Resistance 112 | do | 1.0 |
| Condenser 102 | microfarad | 1 |
| Condenser 109 | do | 0.5 |

The amplifier 39 is primarily a resistance coupled stage and includes both high and low frequency compensation. The high frequency compensation consists of an inductance element or peaking coil 114 in the plate load circuit of tube 115 included in amplifier 39 while the low frequency compensation is obtained by means of a parallel connected resistance 116 and a condenser 117, also connected in the plate load of tube 115.

Tube 115, as shown, is of the pentode type including plate, suppressor grid, screen grid, control grid, and filament type cathode elements, and may desirably be of the commercially available type 1L4. Energizing current is supplied to the filament cathode from the "A" battery A1 and plate voltage is supplied by the "B" battery B1. The plate circuit may be traced from the 180 volt positive terminal of battery B1 through the parallel connected resistance 116 and condenser 117, the peaking coil 114, a resistance 118 to the plate of tube 115 and the cathode thereof to the negative and grounded terminal of the battery. Screen grid voltage is supplied tube 115 from battery B1 and to this end the screen grid is directly connected to the 90 volt tap on the battery.

As shown, the output circuits of electronic switches 36 and 37 are both resistance-capacity coupled to the input circuit of amplifier 39. Specifically, the anodes of the tubes in the electronic switches 36 and 37 are respectively connected by condensers 119 and 120 to the control grid of tube 115 and the latter is connected through a resistance 121 to the 3 volt negative terminal of battery C2, the positive terminal of which is connected to ground and thereby to the filament cathode of tube 115. As previously noted, the electronic switches 36 and 37 operate to alternately impress on the input circuit of amplifier 39 vibration signal voltages from the channel 24 and from the channel 25, and as a consequence, the two vibration signal voltages are reproduced during said alternate half cycles in the output circuit of tube 115.

When switch 44 is in its position b, the output circuit of tube 115 is resistance-capacity coupled to the vertical deflecting plates of the cathode ray tube 20 by means of a condenser 122, a resistance 123 and a potentiometer resistance 124 having a contact 125 and one end terminal of which is connected to the negative and grounded terminal of battery B1. The other end terminal of resistance 124 is connected to the positive 90 volt tap on battery B1. Potentiometer resistance 124 is provided for placing a suitable bias voltage on the vertical deflecting plates of tube 20 for vertically adjusting the positions of the two vibration signal voltage traces produced on the screen. It is noted that variation in the position of contact 125 along resistance 124 is operative to produce a corresponding variation in the vertical position of both of the vibration signal voltage traces on the cathode ray tube screen. The desired vertical displacement of and separation of the two vibration signal voltage traces is accomplished by applying different biases on the control grids of the tubes in the electronic switches 36 and 37 and also by applying different screen grid voltages to said tubes, as previously explained.

Upon adjustment of switch 44 to its position c, the output circuit of tube 115 is disconnected from and the output circuit of the marking signal generator 41 is resistance-capacity coupled to the vertical deflecting plates of the cathode ray tube 20 by means of the aforementioned condenser 98, resistance 99 and potentiometer resistance 100. Potentiometer resistance 100 and its associated adjustable contact 101 are provided for applying a suitable bias to the vertical deflecting plates for vertically shifting the position of the marking signal trace on the screen of the cathode ray tube. Preferably, the contact 101 is so adjusted along the length of resistance 100 that the marking signal trace, and as photographed, appears on the screen below both of the vibration signal voltage traces, as is illustrated in Fig. 8, and wherein curves S1 and S2 represent the two vibration signal voltage traces and curve M2 represents the marking signal voltage trace.

The cathode ray tube 20 may be of the commercially available type 902 and includes in addition to the aforementioned horizontal and vertical deflecting plates, the usual first and second anodes, a control grid, a cathode, and a heater filament. Energizing current is supplied the heater filament from a 6 volt "A" battery A4. Suitable voltages are supplied both of the anodes of tube 20 from the battery B3 which also serves to provide biasing voltage for the control grid. In order to obtain the different voltages needed for the anodes and the control grid, a voltage divider resistance, having one terminal connected to the positive and grounded terminal of battery B3 and its other terminal connected to the negative 540 volt battery terminal, is provided. The voltage divider resistance is shunted by a fixed resistance 129e and includes in series from its positve to its negative terminal a resistance 126, a potentiometer resistance 127, fixed resistances 129, 129a, 129b, and 129c and a pair of parallel connected potentiometer resistances 130 and 132. Potentiometer resistance 127 is provided with an adjustable contact 128 and is utilized for the purpose of varying the voltage impressed on the second anode of the cathode ray tube as required to focus the cathode ray beam on the screen of the tube. The second anode is connected to contact 128 which is adjustable along resistance 127, and the cathode is connected to the negative end of resistance 129. The first anode and also one plate of each pair of the vertical and horizontal deflecting plates are connected to each other and also to the grounded terminal of resistance 126, which terminal is connected to the positive terminal of battery B3.

Potentiometer resistances 130 and 132 are provided for the purpose of adjusting the intensity of the cathode ray beam and are arranged to be selectively connected in circuit between the cathode and control grid of tube 20 by means of a two position switch 134 which comprises a part of the aforementioned function switch. In position b of switch 134 contact 131 movable along resistance 130 is connected to the control grid of tube 20 while contact 133 is connected to the control grid when switch 134 is in its position c. Contact 131 is so adjusted along resistance 130 that the intensity of the cathode ray beam is sufficiently high to permit the recurrent sweep of the beam for visual observation without causing any damage to the screen. Accordingly, when it is desired to observe the traces on the screen preparatory to making a photographic record thereof, switch 134 is adjusted to its position b.

The potentiometer resistance 132, along which the contact 133 is movable, is provided for increasing the intensity of the cathode ray beam while photographing the traces on the screen. While photographing, only a single sweep of the beam occurs, and therefore, the beam may then be adjusted to a very high intensity without resulting damage to the screen. Considerable damage can be done on the recurrent sweep, however, when the beam intensity is high. Accordingly, it is desirable to provide the two intensities of the beam since the high intensity beam is needed for making the photographic record and inasmuch as a beam of lower intensity is satisfactory for observation of the traces.

Resistances 129b and 129c and the associated switch 129d for selectively shunting out those resistances are provided for the purpose of maintaining the traces produced upon the screen of the cathode ray tube at a substantially uniform and readily visible intensity notwithstanding the tendency for the said traces to become less visible as the sweep frequency provided by generator 40 is increased. To this end the switch 129d is mechanically connected to switch 110 and is arranged to be adjusted to its positions b, c and d in correspondence with the switch 110. Thus, when switch 110 is in its position, b, providing the lowest sweep frequency, switch 129d is in its b position also. When switch 110 is adjusted to its c and d positions, effecting in each case an increase in the sweep frequency, switch 129d is correspondingly moved to its positions c and d to shunt out resistance 129c when in its position c and to shunt out resistances 129c and 129d in its position d. In each case a decrease in the negative bias impressed upon the control grid of tube 20 is effected. This decrease in negative grid bias tends to produce an increase in intensity of the cathode ray tube beam which compensates for the tendency of the beam to become less visible as the sweep frequency is increased.

When tubes 20 and 115 are of the respective types 902 and 1L4 and the battery voltages mentioned are employed, the various circuit components of the amplifier 39 and the energizing and control circuits for the cathode ray tube 20 may have the following characteristics:

| | | |
|---|---|---:|
| Resistance 116 | ohms | 20,000 |
| Resistance 118 | do | 30,000 |
| Resistance 123 | megohm | 0.5 |
| Resistance 124 | do | 1 |
| Resistance 126 | do | 0.4 |
| Resistance 127 | do | 0.1 |
| Resistance 129 | do | 0.2 |
| Resistance 129a | ohms | 500 |
| Resistance 129b | do | 50,000 |
| Resistance 129c | do | 50,000 |
| Resistance 129e | do | 10,000 |
| Resistance 130 | do | 20,000 |
| Resistance 132 | do | 20,000 |
| Condenser 117 | microfarads | 16 |
| Condenser 122 | do | 0.05 |
| Inductance element 114 | millihenries | 2.5 |

In Figs. 9, 10, 11 and 12 I have shown an instrument embodying the circuit arrangement described in connection with Figs. 3–6 and which incorporates suitable control devices, adapted to be operated during flight, for adjusting the various switches, for visually observing the vibration and marking signal traces on the screen of the oscillograph to determine what adjustments are required and what effect the adjustments made have on the oscillographic pattern, and for making a photograph of the screen. This instrument constituting the preferred embodiment of my invention is completely self-contained and includes all of the batteries and a camera capable of making 24 records as well as all of the circuit components shown in Fig. 3.

Referring now to Figs. 9 and 10, it will be seen that the instrument is wholly contained within a casing designated by the character 135 and which may be composed of aluminum or other lightweight material having the necessary rigidity. The instrument includes three separate compartments formed by channel members 136 and 137 which add strength to the instrument casing. In Fig. 9 a portion of the upper panel or cover 141 has been broken away to reveal the channel members 136 and 137 and the compartments 138, 139 and 140 formed thereby. Preferably, the casing 135 is so designed that the cover 141 and the side walls may be readily removed to permit easy access to the components contained in the various compartments.

The electronic amplifiers 27, 29, 31, 33 and 39, the integrators 28 and 32, the electronic switches 36 and 37, the multi-vibrator 38, the marking signal generator 41, and the sweep frequency generator 40 are all arranged within the compartment 138. It is noted, however, that the various switches for adjusting the electrical circuit components are supported by the upper panel 141 of the instrument and are provided with exteriorly disposed knobs for facilitating adjustment thereof.

The cathode ray tube 20, the hinged viewing mirror 22, the camera 3 including shutter 5, and the film 6, which constitutes one of the films in a film pack 142 of the magazine type, are all contained within the compartment 139 while all of the various batteries required for energizing the instrument, a few of which may be seen in Fig. 9, are contained within the compartment 140.

As shown, the compartment 139 is provided with a hood 143 which may be held by removable screws to the side of the instrument for making the compartment 139 long enough to accommodate the cathode ray tube 20 and to provide proper focussing of the camera 3. The cathode ray tube 20 is supported at this end of the instrument by a socket 144, which, in turn, is mounted on a bracket 145. The bracket 145 is supported by the channel members 136 and 137. At its other end the cathode ray tube 20 is held to prevent displacement thereof by a supporting cylindrical member 146 carried by a plate 147 through a circular opening in which the member 146 extends. The end of member 146 engaging the cathode ray tube 20 is shaped as shown in Fig. 10 in order to permit easy replacement of the cathode ray tube 20. A cover plate 148 fastened to the top panel 141 of the instrument by removable screws is provided to facilitate such replacement.

When it is desired to remove the tube 20, the plate 148 is removed, the tube 20 is pushed to the left against the restraining force of the bracket 145 supporting the tube socket in order to disengage the screen end of the tube from the cylindrical supporting member 146, and the tube 20 may then be lifted out through the opening in the panel 141, the tube being simultaneously given movement to the right in order to effect disengagement with the socket 144. Similar operations are required in order to insert a new cathode ray tube in the instrument.

Although not shown in the drawing, the switches 42, 44, 97 and 134 preferably are all ganged together and comprise the "function switch" aforementioned. The "function switch" is actuated by a single knob designated by the character 149 and is provided with a scale having six different positions which in Fig. 9 may be labelled, reading in a clockwise direction, as follows:

(1) View signals
(2) View marking signal
(3) Discharge
(4) Print signals
(5) Discharge
(6) Print marking signals The table immediately following shows the positions assumed by the switches 42, 44, 97 and 134 as the function switch is adjusted to each of its six positions.

|   | 42 | 44 | 97 | 134 |
|---|----|----|----|-----|
| 1 | b  | b  | b  | b   |
| 2 | b  | c  | c  | b   |
| 3 | c  | -  | b  | b   |
| 4 | d  | b  | b  | c   |
| 5 | c  | -  | b  | b   |
| 6 | d  | c  | c  | c   |

To the attainment of such operation the switches 42, 44, 97 and 134 preferably comprise separate sections of a ganged multiple point switch having six operative positions. Points on the separate sections are directly connected to each other as required to cause the various switches to effect the above sequence of circuit connections as the gang switch is successively adjusted into each of its six positions.

As shown in Fig. 9, the instrument is also provided with suitable knobs 150, 151, 152, 153 and 154 for respectively accomplishing the desired adjustments of the attenuators 26 and 30, the connection of the integrators 28 and 32 into and out of the channels 24 and 25, and the adjustments of the frequencies of the marking and sweep voltages to a value commensurate with the frequencies of the vibration signal voltages. A multipoint power switch 155 is also provided for disconnecting the various battery circuits when the instrument is not in use. Those skilled in the art will readily understand how the switch 155 may be connected in the circuit of Fig. 3 to accomplish this result.

Suitable designations are placed on scales disposed in coöperative relation with the knobs 150—155 in order to facilitate use of the latter. Thus, the scales associated with knobs 150 and 151 designate the ratios of the attenuator output voltages to the full amplifier voltage gain for each of the knob positions, the scales associated with the knobs 152 and 153 indicate whether the integrators 28 and 32 are connected into or disconnected from the channel 24 or 25 individual thereto, the scale associated with knob 154 indicates the marking signal frequency and also the sweep voltage frequency, and the scale associated with the knob 155 indicates whether the power is turned on or off.

Push button 43 for effectuating the single sweep of the cathode ray beam extends through the upper panel 141 of the instrument in such a manner as to be easily accessible for manipulation. In addition, a viewing hood 156 for observing the traces on the cathode ray tube screen and slots 157 and 158 for respectively accommodating the film pack 142 and a spare pack 159 are provided in the panel 141, as shown. Each film pack includes 12 films which may be successively exposed by moving the slide provided with each pack. When all of the films of pack 142 have been exposed, it is removed from slot 157 and pack 159 is inserted therein and its films successively exposed. The exposed pack 142 may be lodged in slot 158 while the second pack 159 is being exposed. Thus, the instrument is capable of making 24 successive photographic records.

The viewing hood 156 comprises a hinged plate provided with a tab 160 which may be easily grasped for lifting the plate up and thereby opening the hood to permit an observer to look into the interior of the instrument to view the pattern on the oscillograph screen which is reflected through the opening by mirror 22. Suitable latch means of a type known in the art are provided to hold the hinged plate stationary when the latter is adjusted to its open (viewing) and closed (photographing) positions. In Figs. 9 and 10 the hinged plate is shown in its closed position. The hinged plate is also provided with a projecting part designated by the character 161 which is disposed in cooperative relation with a movable pin 162 provided for effecting angular displacement of the viewing mirror 22 from the optical path between the screen of the cathode ray tube 20 and the lens 4 of the camera 3 when the viewing hood 156 is closed. As shown in Figs. 10 and 11, the mirror 22 is carried by a U-shaped bracket 163 which is arranged to be angularly deflected, being supported by its legs on bearings 164 and 165 which, in turn, are fastened to plate 147. Mirror 22 is glued or oherwise fastened to the inside bottom edge of the bracket 163 so that as the latter is moved counterclockwise through a predetermined angle the mirror is moved from a position wherein it reflects the face of the oscillograph screen through the viewing hood 156 to a position wherein the mirror is out of the range of the optical path between the oscillograph screen and the lens 4 of camera 3.

Bracket 163 is biased for deflection in the clockwise direction into its viewing position by means of a coiled spring 166 one end of which bears against the plate 147 and the other end of which is fastened to one leg of the bracket. The means for deflecting the bracket in a counterclockwise direction and thereby for moving the mirror 22 out of the optical path to the camera when the viewing hood 156 is closed includes a part 167 projecting from the last mentioned leg of the bracket 163, a link 168, and a member 169 which is pivoted at one end on the plate 147 and rests at a point intermediate its ends on the pin 162. One end of the link 168 is pivoted on the projecting part 167 and its other end extends through a guide member 170 and rests on a bent over portion of the free end of the member 169, tending to effect clockwise movement of the member 169 against the restraining force of the pin 162. The guide member 170 is fastened to the plate 147. The various parts are so arranged that when the viewing hood 156 is closed the pin 162 is pushed in by the projection 161 and causes the member 169 to deflect in a counterclockwise direction into the position shown in Figs. 10 and 11. In so deflecting the member 169 bears against the associated end of the link 168 and causes the bracket 163 to be deflected in a counterclockwise direction against the restraining force of the coiled spring 166. Such movement of the bracket 163 is effective to move the mirror 22 out of the optical path between the cathode ray tube 20 and the camera 3. When so adjusted the various parts are held against movement by the latch means provided on the viewing hood 156.

When the viewing hood 156 is opened the bracket 163 is deflected by the coiled spring 166 in a clockwise direction, since the restraining force of the pin 162 has been removed, and causes the various associated parts to similarly deflect until a shoulder 171 provided on the pin 162 abuts against a bent over portion of the plate 147, which in turn is fastened to the under side of the top panel 141 of the instrument. In this position of the parts the mirror 22 reflects the face of the oscillograph screen through the viewing hood 156 thereby permitting an observer to view the traces on the screen.

As is best seen in Fig. 10, the shutter 5 is pivoted for rotation at one end on a shaft 172 with which it is rigid and which is carried by the channel members forming the three compartments and is arranged to be deflected in a clockwise direction from the position shown to expose the film 6. The means for deflecting shutter 5 include an arm 173 which is rigid with shaft 172, a link 174, a bell crank lever 175 pivoted at 176 on one of the channel members, and a push pin 177 provided with a knob 178 hereinafter termed the camera shutter knob. A U-shaped bracket 179 through the arms of which the push pin 177 extends is provided for guiding the pin 177 and a shoulder 180. A cooperating spring 181 arranged, as shown, between the arms of the bracket 179 is provided for biasing the push pin into the position shown. In that position of the push pin the bell crank 175, one end of which bears against the end of the push pin and the other end of which provides a pivot point for one end of the link 174, is biased to its extreme counterclockwise position by a spring 182 connecting the bell crank lever 175 to the shaft 172. The other end of the link 174 is connected to the movable end of arm 173.

With the parts in the position shown the shutter 5 prevents exposure of the film 6 but upon deflection of the bell crank 175 in a clockwise direction against the restraining force of the spring 182 the shutter 5 is deflected by the action of link 174 and arm 173 in a clockwise direction to the position wherein it is out of the optical path between the film 6 and the face of the oscillograph screen, thereby exposing the film. This result is accomplished by pushing in on the camera shutter knob 178 against the restraining action of the spring 181. When the camera shutter knob 178 is released the bell crank lever 175 and consequently the shutter 5 are actuated in a counterclockwise direction to their positions shown in dashed lines by the spring 182. While switch 43 has been shown as being externally accessible for separate manipulation, it will be understood that this switch may be mechanically related to push pin 177 and knob 178 so as to be automatically closed when the knob 178 has been depressed to expose the film.

As shown in Fig. 9 and in more detail in Fig. 12 the potentiometer resistances 100, 112, 124, 127, 130 and 132 are mounted on the channel separating the compartments 138 and 139 at a position adjacent the cathode ray tube 20. The shafts of the potentiometer resistances extend into the compartment 138 and are each provided with a kerf suitable for screw driver adjustment from that compartment. The adjustments to the potentiometer resistances, although easily made by virtue of this construction, are not intended to be made during actual flight. It will be understood, however, that, if desired, the various potentiometers may be mounted otherwise and provided with knobs available for adjustment from the exterior of the instrument.

Compartment 140 of the instrument contains all of the batteries needed for the operation of the instrument over a period of at least 8 hours before replacement is necessary. The "A" batteries A1, A2 and A3, which are each comprised of 1½-volt units, may desirably be of the commercially available Burgess type 2FBP, while the "A" battery A4, comprised of two 3-volt units, may be of the Burgess type 2F2H. The "B" battery B1 comprised of four 45-volt units, may be of the Burgess type XX30; the "B" battery B2 may be comprised of four 45-volt units of the Burgess type XX30 and one 67½-volt unit of the Burgess type XX45. The "B" battery B3, comprised of eight 67½-volt units, may be of the Burgess type XX45. The "C" battery C1 and a portion of the units of the "C" battery C2 may be comprised of two 3-volt units of the Burgess type 5540. The remaining units of battery C2 may be comprised of a 7½-volt unit of the Burgess type 5540. If desired, the batteries C1 and C2 may be made up of a suitable number of Mallory bias cells.

The sequence of operation of the preferred embodiment of my invention is as follows:

1. Switch the integrator knobs 152 and 153 to the desired position.

2. With the hood 156 open and the function switch knob 149 in the position marked "Viewing signal" adjust the attenuator knobs 150 and 151 for the desired amplitude of the vibration signal traces as seen through the viewing hood 156 and adjust the sweep frequency knob 154 for a sweep frequency commensurate with the frequency of the vibration signals.

3. Check the marking signal by adjusting the function switch knob 149 to the position marked "View marking signal."

5. Turn the function switch knob 149 to the position "Print signal" passing only momentarily on the "discharge" point.

6. Depress the camera shutter knob 178 and close the push button switch 43. Release both immediately.

7. Adjust the function switch knob 149 to the "Print marking signal" position pausing only momentarily on the "discharge" point.

8. Again depress the camera shutter knob 178 and close the push button switch 43. Release both immediately.

Subject matter disclosed but not claimed herein is disclosed and is being claimed in the application Serial Number 593,038, filed concurrently herewith, of Donald C. Culver, Rudolf F. Wild, Thomas R. Harrison and Walter P. Wills.

While, in accordance with the provisions of the statutes, I have illustrated and described the best forms of my invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent, is as follows:

1. A device to compare the frequency, phase and amplitude of two electrical signals comprising an electronic amplifier to amplify each of said signals, a cathode ray tube having vertical deflecting plates and horizontal sweep deflecting plates, an electronic switching device to alternately impress at a predetermined frequency during mutually exclusive intervals the amplified quantity of each of said signals on the said vertical deflecting plates comprising two electron discharge tubes each having anode, cathode, screen, and first and second control electrode elements, means to impress said signals between the second control electrode and cathode elements of an associated one of said tubes, means to negatively bias the second control electrode element of both of said tubes, the negative bias on the second control electrode element of said one tube being greater than that on the second control electrode element of the second tube, a source of energizing voltage, circuits including said voltage source and connecting the anode and cathode elements of each of said tubes, connections from the screen elements of each of said tubes to points of positive potential on said voltage source, the screen element of the second tube being connected to a point of greater positive potential than the screen element of said one tube, and means to impress voltages 180° out of phase between the first control electrode and cathode elements of said tubes, first and second relaxation oscillators to generate electrical signals of known frequency substantially lower than said predetermined frequency so as simultaneously to produce traces of the amplified signals as said amplified signals simultaneously occur, and switching means operative in one condition to couple the anode and cathode elements of both of said tubes to said vertical deflecting plates and to connect the output circuit of said first relaxation oscillator to said horizontal sweep deflecting plates and operative in a second condition to connect the output circuits of said first and second relaxation oscillators to said horizontal sweep and vertical deflecting plates, respectively.

2. An electronic switching device for alternately impressing during mutually exclusive intervals a first electrical signal and a second electrical signal on the beam deflection plates of a cathode ray tube employing electrostatic beam deflecting plates comprising two electron discharge tubes each having anode, cathode, screen, and first and second control electrode elements, means to impress the first electrical signal between the second control electrode and cathode elements of one tube, means to impress the second electrical signal between the second control electrode and cathode elements of the second tube, means to negatively bias the second control electrode element of both of said tubes, the negative bias on the second control electrode element of said one tube being greater than that on the second control electrode element of the second tube, a source of energizing voltage, circuits including said voltage source and connecting the anode and cathode elements of each of said tubes, an impedance connected in each of said circuits, means coupling the anode and cathode elements of both of said tubes to terminals adapted to be connected to the beam deflecting plates of a cathode ray tube, connections from the screen elements of each of said tubes to points of positive potential on said voltage source, the screen element of the second tube being connected to a point of greater positive potential than the screen element of said one tube, and relaxation oscillator means to impress voltages 180° out of phase between the first control electrode and cathode elements of said tubes comprising two other electron discharge tubes each having anode, suppressor, screen, control electrode and cathode elements, circuits including said voltage source for energizing the screen and anode elements of said other tubes, capacitors cross-connecting the anode and control electrode elements of said other tubes, a resistor connected in each of the anode circuits of said other tubes, a biasing resistor for said control electrode elements of said other tubes connected between the cathodes of said other tubes and the negative terminal of said voltage source, and a resistor connected between the control electrode element of each of said other tubes and a positive potential point on said source.

3. An electronic switching device for alternately impressing during mutually exclusive intervals a first electrical signal and a second electrical signal on the beam deflecting plates of a cathode ray tube employing electrostatic beam deflecting plates comprising two electron discharge tubes each having anode, cathode, screen, and first and second control electrode elements, means to impress the first electrical signal between the second electrode and cathode elements of one tube, means to impress the second electrical signal between the second control electrode and cathode elements of the second tube, means to negatively bias the second control electrode element of both of said tubes, the negative bias on the second control electrode element of said one tube being greater than that on the second control electrode element of the second tube, a source of energizing voltage, circuits including said voltage source and connecting the anode and cathode elements of each of said tubes, an impedance connected in each of said circuits, means coupling the anode and cathode elements of both of said tubes to terminals adapted to be connected to the beam deflecting plates of a cathode ray tube, connections from the screen elements of each of said tubes to points of positive potential on said voltage source, the screen element of the second tube being connected to a point of greater positive potential than the screen element of said one tube, and means to impress voltages of approximately square wave shape and 180° out of phase between the first control electrode and cathode elements of said tubes.

4. An electronic switching device for alternately transmitting to a utilization circuit during mutually exclusive intervals a first electrical signal and a second electrical signal comprising two electron discharge tubes each having anode, cathode, screen, and first and second control electrode elements, means to impress the first electrical signal between the second control electrode and cathode elements of one tube, means to impress the second electrical signal between the second control electrode and cathode elements of the second tube, means to negatively bias the second control electrode element of both of said tubes, the negative bias on the second control electrode element of said one tube being greater than that on the second control electrode element of the second tube, a source of energizing voltage, circuits including said voltage source and connecting the anode and cathode elements of each of said tubes, an impedance connected in each of said circuits, means coupling the anode and cathode elements of both of said tubes to terminals adapted to be connected to the utilization circuit, connections from the screen elements of each of said tubes to points of positive potential on said voltage source, the screen element of the second tube being connected to a point of greater positive potential than the screen element of said one tube, and means to impress voltages of approximately square wave shape and 180° out of phase between the first control electrode and cathode elements of said tubes.

5. An electronic switching device for alternately transmitting to a utilization circuit during mutually exclusive intervals a first electrical signal and a second electrical signal comprising two electron discharge tubes each having anode, cathode, screen, and first and second control electrode elements, means to impress the first electrical signal between the second control electrode and cathode elements of one tube, means to impress the second electrical signal between the second control electrode and cathode elements of the second tube, means to negatively bias the second control electrode element of both of said tubes, the negative bias on the second control electrode element of said one tube being greater than that on the second control electrode element of the second tube, a source of energizing voltage, circuits including said voltage source and connecting the anode and cathode elements of each of said tubes, an impedance providing compensation over at least two widely different frequency ranges connected in each of said circuits, means coupling the anode and cathode elements of both of said tubes to terminals adapted to be connected to the utilization circuit, connections from the screen elements of each of said tubes to points of positive potential on said voltage source, the screen element of the second tube being connected to a point of greater positive potential than the screen element of said one tube, and means to impress voltages of approximately square wave shape and 180° out of phase between the first control electrode and cathode elements of said tubes.

6. A device to compare the frequency, phase, and amplitude of two electrical signals, comprising a sweep signal generator having an output portion and a condenser charging circuit including a condenser and operative, for a first connection of said condenser in said circuit, to produce in said output portion an electrical signal of regularly varying amplitude and known frequency and operative, for a second connection of said condenser in said circuit, to produce in said output portion a non-regularly recurrent single cycle of an electrical signal, the frequency of occurrence of which is normally unrelated to the frequencies of said electrical signals; a marking signal generator having an output portion and operative to produce therein electrical signals of known frequency; a cathode ray tube having vertical deflecting means and having horizontal deflecting means connected to the output portion of said sweep signal generator; electronic switch means having an output portion and operative to apply the electrical signals under comparison thereto alternately at a rate which is substantially higher than the frequencies of the signals produced by said generators; and a multi-position switching means having a plurality of operative conditions and operative in a first condition to connect the output portion of said electronic switch means to said vertical deflecting means and to connect said condenser in said first connection, operative in a second condition to connect the output portion of said marking signal generator to said vertical deflecting means and to connect said condenser in said first connection, operative in a third condition to connect the output portion of said electronic switch means to said vertical deflecting means and to connect said condenser in said second connection, and operative in a fourth condition to connect the output portion of said marking signal generator to said vertical deflecting means and to connect said condenser in said second connection.

DONALD C. CULVER.

(References on following page)

REFERENCES CITED

The following references are of record in the file of this patent:

UNITED STATES PATENTS

| Number | Name | Date |
|---|---|---|
| 1,939,434 | Burse | Dec. 12, 1933 |
| 2,089,430 | Roys et al. | Aug. 10, 1937 |
| 2,146,862 | Shumard | Feb. 14, 1939 |
| 2,153,140 | Diehl et al. | Apr. 4, 1939 |
| 2,157,434 | Potter | May 9, 1939 |
| 2,221,115 | Shepard | Nov. 12, 1940 |
| 2,241,619 | Sherman | May 13, 1941 |
| 2,282,340 | Pieplov | May 12, 1942 |
| 2,305,268 | Minor et al. | Dec. 15, 1942 |
| 2,344,296 | Frink | Mar. 14, 1944 |
| 2,350,069 | Schrader et al. | May 30, 1944 |
| 2,355,363 | Christaldi | Aug. 8, 1944 |
| 2,359,572 | McWhirter et al. | Oct. 3, 1944 |
| 2,416,328 | Labin | Feb. 25, 1947 |
| 2,421,521 | Poch | June 3, 1947 |
| 2,436,725 | Morrison | Feb. 24, 1948 |

OTHER REFERENCES

"Journal of Applied Mechanics," vol. 4, December 1939, pages A-151 to A-155, 177-351.17.

Publication II, "Wireless Engineer," March 1939, vol. 16, pages 126-133. Patent Office Library TK-5700-.E96; 171-95, 6A.

Publication III, "Wireless Engineer," August 1939, vol. 16, pages 391-399. Patent Office Library TK-5700-.96; 171-95 6A.